United States Patent
Zhou et al.

(10) Patent No.: US 11,825,293 B2
(45) Date of Patent: Nov. 21, 2023

(54) RELATIONS BETWEEN BEAM GROUP BEAM FAILURE RECOVERY AND CELL LEVEL BEAM FAILURE RECOVERY

(71) Applicant: QUALCOMM Incorporated, San Diego, CA (US)

(72) Inventors: Yan Zhou, San Diego, CA (US); Tianyang Bai, Somerville, NJ (US); Mostafa Khoshnevisan, San Diego, CA (US); Jelena Damnjanovic, Del Mar, CA (US); Tao Luo, San Diego, CA (US); Xiaoxia Zhang, San Diego, CA (US); Sony Akkarakaran, Poway, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/448,640

(22) Filed: Sep. 23, 2021

(65) Prior Publication Data

US 2022/0104037 A1 Mar. 31, 2022

Related U.S. Application Data

(60) Provisional application No. 63/085,141, filed on Sep. 29, 2020.

(51) Int. Cl.
*H04W 24/04* (2009.01)
*H04B 7/0408* (2017.01)

(52) U.S. Cl.
CPC .......... *H04W 24/04* (2013.01); *H04B 7/0408* (2013.01)

(58) Field of Classification Search
CPC .................................................. H04B 7/0408
See application file for complete search history.

(56) References Cited

U.S. PATENT DOCUMENTS

2020/0119798 A1* 4/2020 Nilsson ................ H04W 76/19
2020/0350972 A1* 11/2020 Yi ............................. H04L 1/12
(Continued)

FOREIGN PATENT DOCUMENTS

| WO | 2020010630 A1 | 1/2020 |
| WO | 2020012618 A1 | 1/2020 |
| WO | 2020048443 A1 | 3/2020 |

OTHER PUBLICATIONS

AT&T: "On Beam Recovery for Partial and Full Control Channel Failure", 3GPP TSG RAN WG1 Meeting NR#3, 3GPP Draft, R1-1716690 Beam Recovery for Partial and Full Control Channel Failure_Updated, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 18, 2017 (Sep. 18, 2017), pp. 1-7, XP051353812.
(Continued)

*Primary Examiner* — Fahmida S Chowdhury
(74) *Attorney, Agent, or Firm* — Dalei Dong; Haynes and Boone, LLP

(57) ABSTRACT

In operation, the UE in the cell (SpCell/SCell) may be configured to operate with beam group specific BFRs, cell-level BFRs, or combinations of them under a beam failure configuration that is determined according to various rules. A method of wireless communication performed by a user equipment (UE) and a UE is disclosed. The method includes determining a beam failure configuration for a serving cell, the beam failure configuration including at least one of a beam failure parameter of a beam group or a beam failure parameter of a cell; and detecting, in the serving cell based at least in part on the beam failure configuration, a beam failure recovery (BFR) based at least in part on the beam failure configuration. The beam failure configuration
(Continued)

is determined based on various rules that control the operation of the BFR.

30 Claims, 14 Drawing Sheets

(56) References Cited

U.S. PATENT DOCUMENTS

| | | | | |
|---|---|---|---|---|
| 2020/0374960 | A1* | 11/2020 | Deenoo | H04W 74/0833 |
| 2021/0044342 | A1* | 2/2021 | He | H04B 7/0695 |
| 2021/0126690 | A1* | 4/2021 | Matsumura | H04B 7/0695 |
| 2021/0282168 | A1* | 9/2021 | Matsumura | H04L 5/0048 |
| 2021/0320764 | A1* | 10/2021 | Gao | H04B 7/0695 |
| 2022/0038165 | A1* | 2/2022 | Li | H04W 56/001 |
| 2022/0086715 | A1* | 3/2022 | Hong | H04B 7/088 |
| 2022/0166581 | A1* | 5/2022 | Zhang | H04B 7/0695 |

OTHER PUBLICATIONS

Retrieved from the Internet: URL: https://www.3gpp.org/ftp/tsg_ran/WG1_RL1/TSGR1_AH/NR_AH_1709/Docs/R1-1716690.zip, [retrieved on Sep. 18, 2017], Sections 2, 3 figure 1.
International Search Report and Written Opinion—PCT/US2021/052053—ISA/EPO—dated Jan. 20, 2022.

* cited by examiner

RELATIONS BETWEEN BEAM GROUP BEAM FAILURE RECOVERY AND CELL LEVEL BEAM FAILURE RECOVERY

CROSS-REFERENCE TO RELATED APPLICATIONS

The present application claims priority to and the benefit of the U.S. Provisional Patent Application No. 63/085,141, filed Sep. 29, 2020, titled "Relations between Beam Group Beam Failure Recovery and Cell Level Beam Failure Recovery," which is hereby incorporated by reference in its entirety as if fully set forth below and for all applicable purposes.

TECHNICAL FIELD

This application relates to wireless communication systems, and more particularly to relations between beam group beam failure recovery and cell level beam failure recovery.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some wireless communications systems, a UE and a base station may communicate over a communication link using a directional beam. Changes in the radio environment between the UE and the base station may degrade the quality of the beam used by the UE and the base station, which may result in communication failures between the UE and a serving cell (e.g., primary cell (Pcell), secondary cell (Scell), or both). The UE may attempt to perform a beam failure recovery (BFR) procedure to re-establish connection with the serving cell. Additionally, in some wireless communications systems a UE may be in communication with more than one transmission-reception point (TRP) (e.g., in a multi-TRP configuration) of a serving cell. Each of the more than one TRP may transmit downlink transmissions to the UE according to a beam configuration and the UE may decode the downlink transmissions from each of the more than one TRPs according to the beam configurations. Efficient detection and recovery from beam failures in multi-TRP configurations may help enhance multi-TRP communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of wireless communication performed by a user equipment (UE) includes receiving, from a base station (BS), a communication indicating a beam failure configuration for a serving cell, the beam failure configuration including at least one of a beam failure parameter of a beam group or a beam failure parameter of a cell; and detecting, in the serving cell based at least in part on the beam failure configuration, a beam failure. The beam failure configuration is determined based on various rules that control the operation of the BFR.

In some aspects, a UE includes a memory; a processor coupled to the memory; and a transceiver coupled to the processor and configured to receive, from a base station (BS), a communication indicating a beam failure configuration for a serving cell, the beam failure configuration including at least one of a beam failure parameter of a beam group or a beam failure parameter of a cell, wherein the processor is configured to detect, in the serving cell based at least in part on the beam failure configuration, a beam failure.

In some aspects, a non-transitory computer-readable medium having program code recorded thereon for operation by a UE is provided, the program code including code for causing a UE to receive, from a base station (BS), a communication indicating a beam failure configuration for a serving cell, the beam failure configuration including at least one of a beam failure parameter of a beam group or a beam failure parameter of a cell; and code for causing the UE to detect, in the serving cell based at least in part on the beam failure configuration, a beam failure.

In some aspects, a UE includes means for receiving, from a base station (BS), a communication indicating a beam failure configuration for a serving cell, the beam failure configuration including at least one of a beam failure parameter of a beam group or a beam failure parameter of a cell; and means for detecting, in the serving cell based at least in part on the beam failure configuration, a beam failure.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
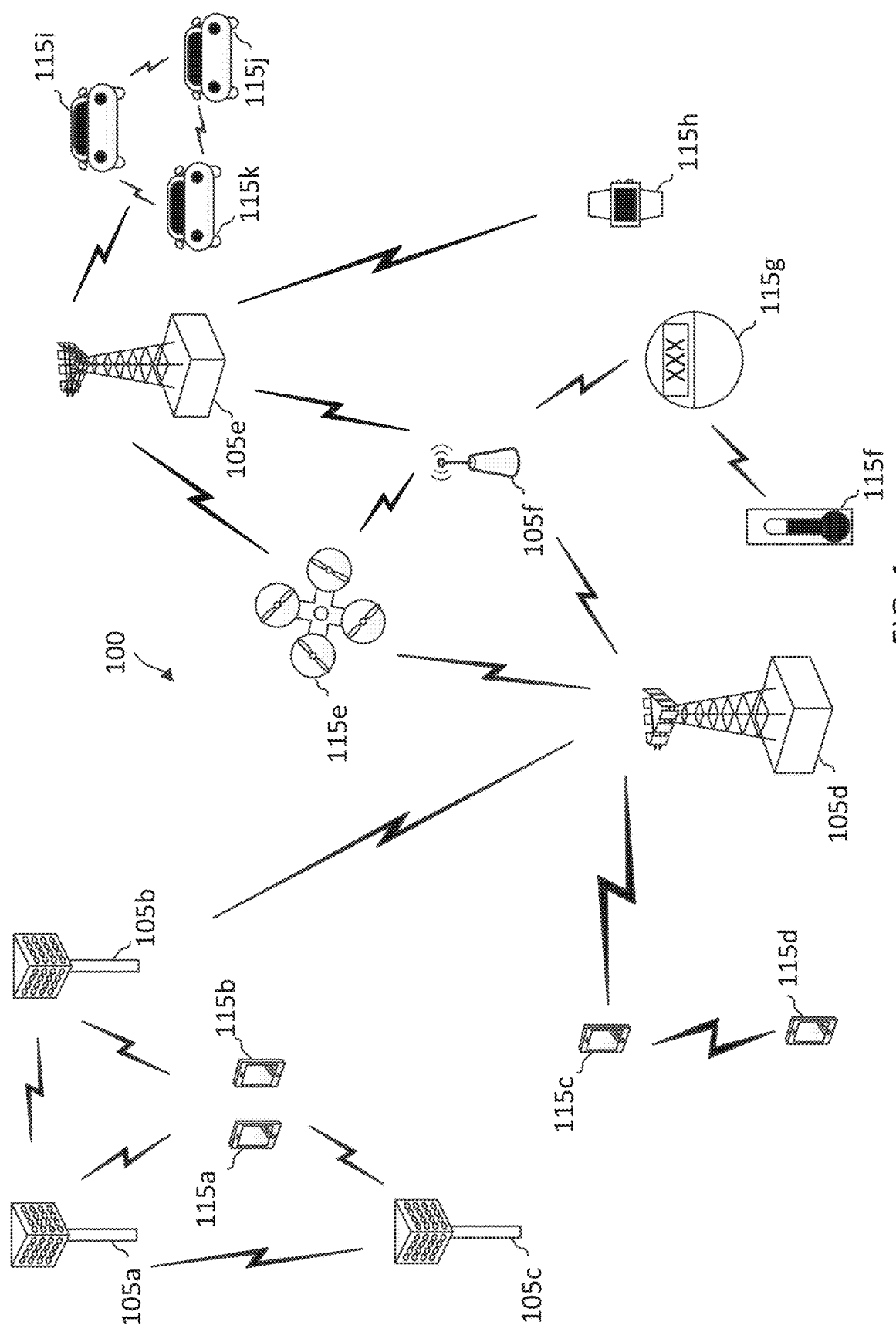
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In some wireless communications systems, a user equipment (UE) may support communications with a serving cell via multiple beam groups. In some instances, each beam group may be associated with one or more transmission-reception points (TRPs), one or more beam directions, and/or one or more other spatial beam parameters. The UE may receive downlink transmissions (e.g., via a physical downlink shared channel (PDSCH)) from multiple TRPs. Additionally, the UE may decode each of the downlink transmissions according to a beam configuration associated with the downlink transmission. Further, such multi beam group communications may be primary cell (Pcell) communications, secondary cell (Scell) communications, or both. In some cases, one or more beams from a particular beam group may degrade to a point where effective communication via the beam is unlikely. Thus, beam failure detection (BFD), beam failure recovery (BFR), radio link monitoring (RLM), and/or radio link failure (RLF) recovery in such cases may be beneficial to help communications. In cases where multiple beam groups are used for communications, techniques such as discussed herein may be used to identify a communication failure (e.g., beam failure and/or RLF) in a serving cell and/or recover from the communication failure based on a beam failure parameter of a beam group (e.g., TRP), a beam failure parameter of the cell, or both a beam failure parameter of a beam group and a beam failure parameter of the cell.

In some cases, a UE may establish a connection with a Pcell and a Scell, where the Scell, and in some cases the Pcell, uses beamformed communications via two or more beam groups (e.g., transmission-reception points (TRPs)). In some cases, the different beam groups may be associated with different control resource set (CORESET) pool index values, and one or more component carriers (CCs) may be configured with multiple CORESET pool index values. Thus, from the perspective of the UE, different TRPs are transparent, and the UE can identify different CORESET pool index values associated with received signals.

In some cases, the UE may perform BFD procedures that may identify one or more beams associated with a particular CORESET pool index value that have a degraded channel quality. In some cases, reference signals transmitted via each of the TRPs (e.g., for BFD or for candidate beam detection (CBD)) may provide an indication of a corresponding CORESET pool index (e.g., based on a reference signal sequence), which may be detected at the UE. In some cases, the UE may determine to declare a beam failure for one or more beams, and may initiate a beam failure recovery (BFR) in response. In some cases, a BFR MAC-CE containing information regarding the beam group and beam failure, as discussed further below, is provided.

In operation, the UE in the serving cell may operate with per-beam group beam failure detection and/or recovery parameters, cell-level beam failure detection and/or recovery parameters, or a combination of per-beam group and cell-level beam failure detection and/or recovery parameters. Accordingly, in some instances a UE may perform BFD based on per-beam group BFD parameters or based on cell-level BFD parameters. Similarly, in some instances the UE may perform BFR based on per-beam group BFR parameters or based on cell-level BFR parameters. Therefore, in some instances the UE may perform BFD based on per-beam group BFD parameters and perform BFR based on cell-level BFR parameters, or vice versa (perform BFD based on cell-level BFD parameters and perform BFR based on per-beam group BFR parameters). The per-beam group and/or the cell-level BFD and/or BFR parameters may be dynamically configured (e.g., by a serving cell, BS, UE, or otherwise), predefined (e.g., by network operator, serving cell, BS, UE, standard provisions, or otherwise), or a combination of dynamically configured and predefined. Aspects of the present disclosure provide mechanisms for the deployment of beam group BFD and/or BFR parameters in a serving cell along with cell-level BFD, BFR, RLM, and/or RLF parameters. In this regard, aspects of the present disclosure can define the configuration/operational relationship between TRP-specific BFD/BFR and existing cell-level BFD/BFR and RLM/RLF, including between TRP-specific BFD/BFR and SpCell/SCell BFD/BFR and between TRP-specific BFD/BFR and SpCell RLM/RLF on the same SpCell.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, hybrid TDM-FDM techniques, or spatial division multiplexing (SDM). A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs).

Figure 2A:
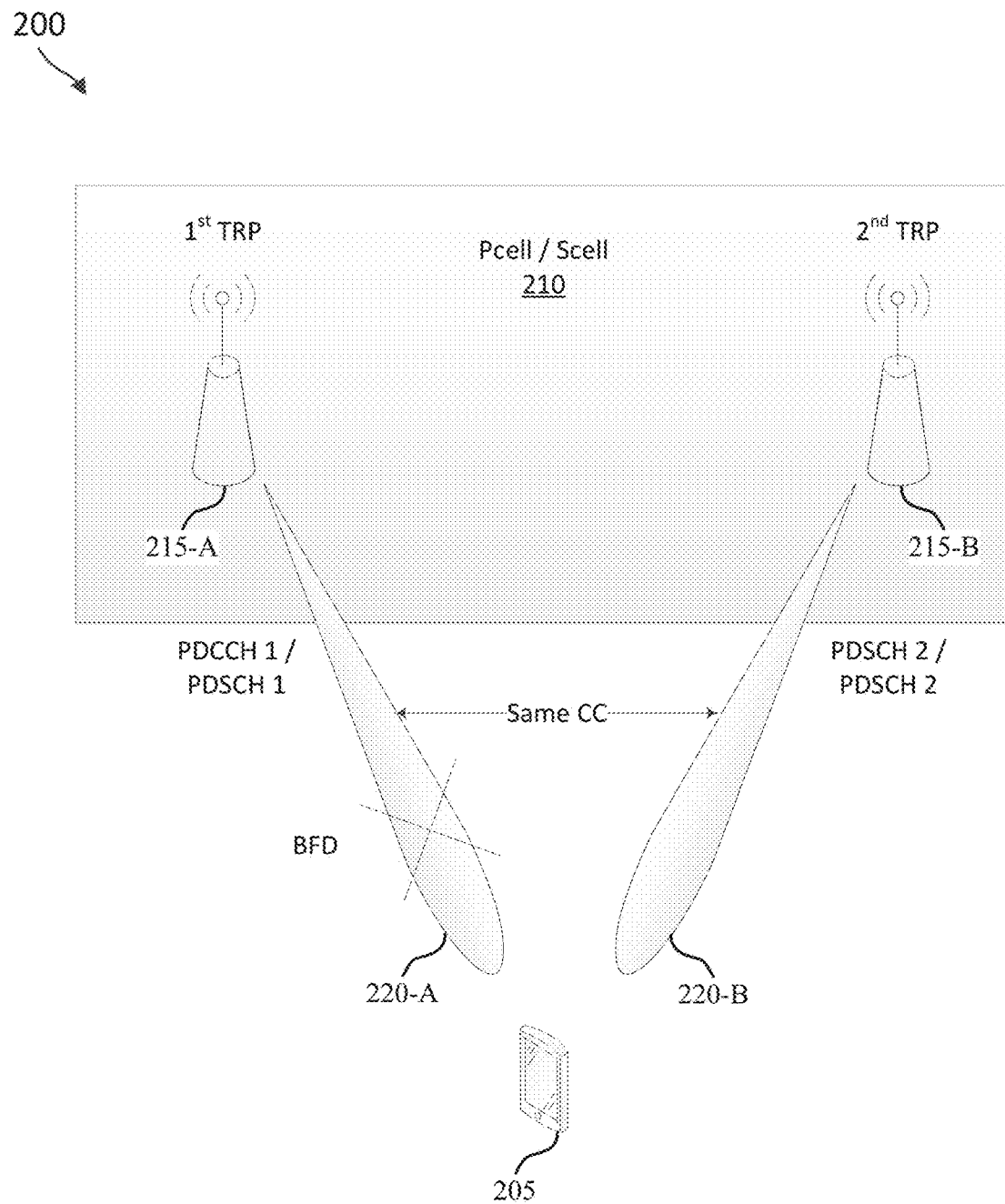
FIG. 2A illustrates an example of a portion of a wireless communication system that supports beam failure recovery techniques for multiple transmission-reception points (TRPs) in a primary or secondary cell according to some aspects of the present disclosure.

FIG. 2A illustrates an example of a wireless communications system 200 that supports beam failure recovery techniques for multiple transmission-reception points (TRPs) in serving cell 210 (Pcell and/or Scell) in accordance with aspects of the present disclosure. As discussed above, the multiple TRPs illustrated in FIG. 2A is an example of multiple beam groups. In some examples, wireless communications system 200 may implement aspects of wireless communications system 100. Wireless communications system 200 may include a UE 205 and in communications with a number of TRPs 215, which may be examples of the corresponding devices described herein. TRPs 215 may, in this example, provide a multi-TRP serving cell, for example, in which a first beam 220-a of a first TRP 215-a and a second beam 220-b of a second TRP 215-b provide communications with the UE 205.

In some cases, the multi-TRP transmissions may be configured based on a single downlink control information (DCI) communication. In some cases, the multi-TRP transmissions may be configured based on multiple downlink control information m(DCI) communications, in which a first DCI (e.g., transmitted in PDCCH1 from first TRP 215-a) schedules a downlink shared channel transmission (e.g., PDSCH1 transmitted from first TRP 215-a via first beam 220-a), and a second DCI (e.g., transmitted in PDCCH2 from second TRP 215-b) schedules a second downlink shared channel transmission (e.g., PDSCH2 transmitted from second TRP 215-b via second beam 220-b). TRP 215 differentiation at the UE 205, in some cases, may be based on a value of a CORESET pool index (e.g., CORESETPoolIndex), where each CORESET (e.g., up to a maximum of five CORESETs) can be configured with a value of CORESET pool index. In some cases, the value of CORESET pool index can be zero or one, which groups the CORESETs into two groups that may correspond to the different TRPs 215. Only some CCs may be configured with two values of CORESET pool index, while other CCs may not be configured with two values of CORESET pool index and thus BFD/BFR for on a per-TRP 215 basis may be provided for CCs that are configured with two values of CORESET pool index.

In some cases, the UE 205 may be configured to provide per-TRP 215 BFR, which enables separate BFD and separate CBD for the beams corresponding to a TRP 215 in a CC that is configured with two values of CORESET pool index. In the absence of per-TRP 215 BFR, beam failure detection and beam candidate determination may not be triggered until all beams in that CC become weak. With per-TRP 215 BFR, when beams for a given TRP become weak, recovery procedures can be done and a best beam corresponding to that TRP 215 can be identified without having to wait for the beams of the other TRP 215 to also become weak, and thus reliability and communications efficiency can be enhanced. In the example, of FIG. 2A, serving cell 210 may be configured with two values of CORESET pool index, with one value associated with the first TRP 215-*a* and a second value associated with second TRP 215-*b*. In this case, each TRP 215 may transmit one or more BFD reference signals that may be monitored by the UE 205. In this example, the UE 205 may determine that the first beam 220-*a* of the first CORESET pool index value has a channel metric (e.g., a reference signal received power RSRP)) that is below a threshold value (e.g., when radio link quality is worse than a threshold $Q_{out}$ for reference signals in BFD reference signal that are associated with CORESET pool index value) for a period of time. Various examples of beam failure declaration, candidate beam detection, and beam recovery are discussed further below.

Figure 2B:
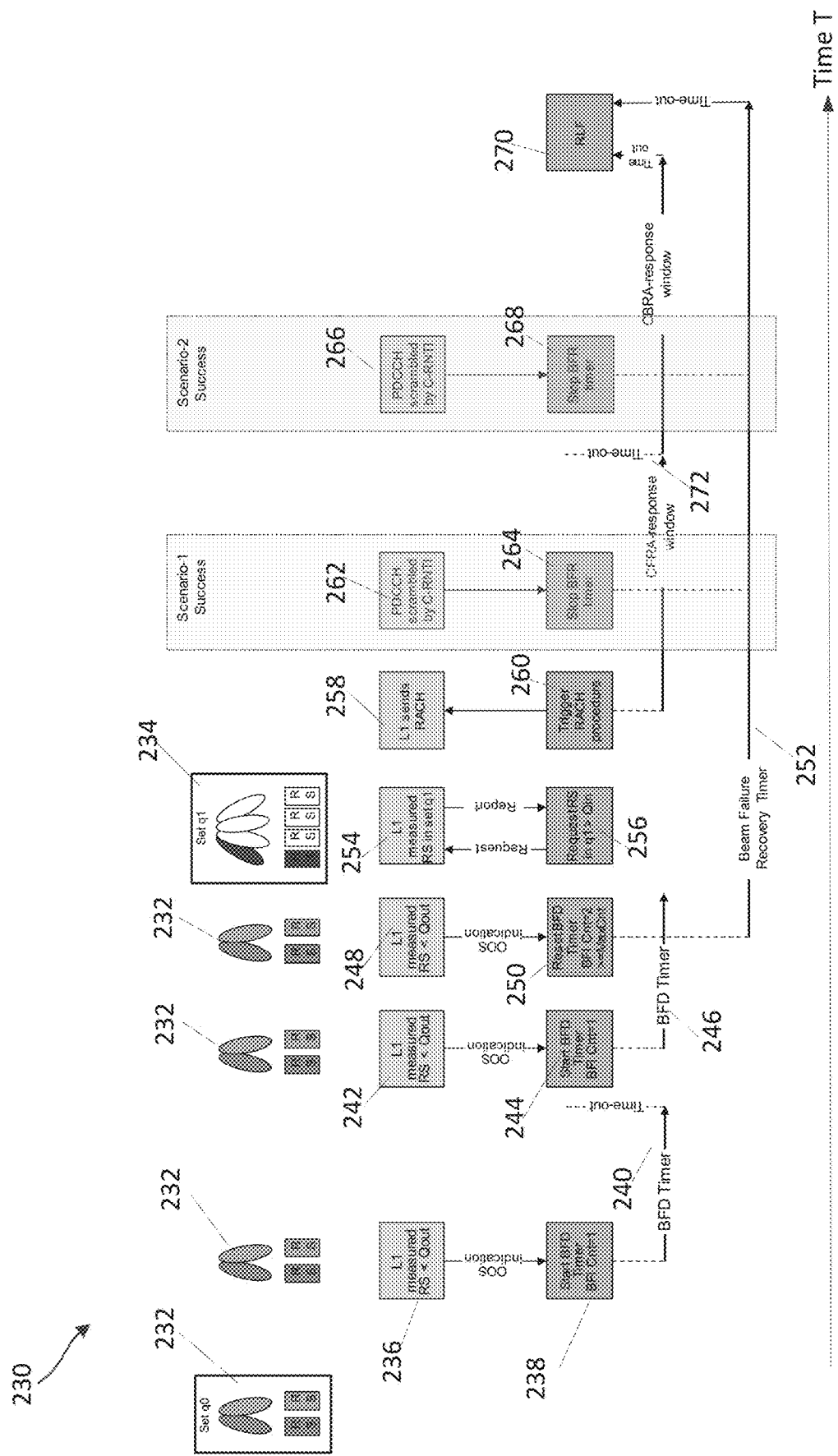
FIG. 2B illustrates aspects of beam failure recovery according to some aspects of the present disclosure.

FIG. 2B illustrates an example sequence 230 that illustrates beam failure detection (BFD) and beam failure recovery (BFR) in a system such as that illustrated in FIG. 2A. As illustrated in FIG. 2B, TRP set q0 232 is providing communications. As illustrated, set q0 includes two TRP reference signals (RS), indicating two communicating beams. For instance, the TRP set q0 232 are reference signals transmitted by the TRP 215-*a* and/or the TRP 215-*b* and monitored and measured by the UE 205 for BFD. In step 236, the level of one or more of the TRP resources in set 232 is measured and determined to be below a threshold value Qout, resulting in provision of an out-of-sync (OOS) indication. In step 238, in response to the OOS indication, a beam failure detector (BFD) timer is started and a beam failure index (BFI) count is set to 1. However, as indicated in FIG. 2B, BFD timer 240 times out prior to receipt of another OOS indication.

In step 242 the level of one or more of the TRP resources in set 232 is measured and determined to be below a configurable threshold value Qout resulting in provision of an OOS indication. As before, in step 244 a BFD timer 246 is started and a BFI counter initiated. As is illustrated in FIG. 2B in step 248, one or more of the TRP resources in set 232 is again measured and determined to be below a threshold value Qout resulting in provision of another OOS indication that occurs within BFD timer 246. In step 250, the BFI counter is incremented until the BFI counter is at a MaxCnt value. In this particular example, MaxCnt is set to 2, however MaxCnt can be configurably set to any integer such that if the TRP resources result in OOS indication for set period of time.

In step 250, with BFI counter at the MaxCnt value, a BFR timer 252 is started. In step 254, a reference signal received power (RSRP) corresponding to the TRP RS q1 234 is measured to have a value greater than the threshold. In step 256, a report is received from step 254 and a request for the TRP resource in set 234 is presented. In step 260, a random access procedure on a Random Access Channel (RACH) can be triggered and in step 258 the RACH request can be sent, for example to a primary cell (PCell) receiver of the request. Transmission of the RACH message can trigger a response window 272. Within the first timing window, a PDCCH 262 can be received that stops the BFR timer 264 within the time-out period of the response window 272 or a PDCCH 266 that stops BFR 268 after the response window time out but before the BFR timer 252 timeout will result in adaption of the TRP resource from set q1 234. However, if step 270 is reached, the BFR times out and results in overall failure to recover in step 270.

Figure 3A:
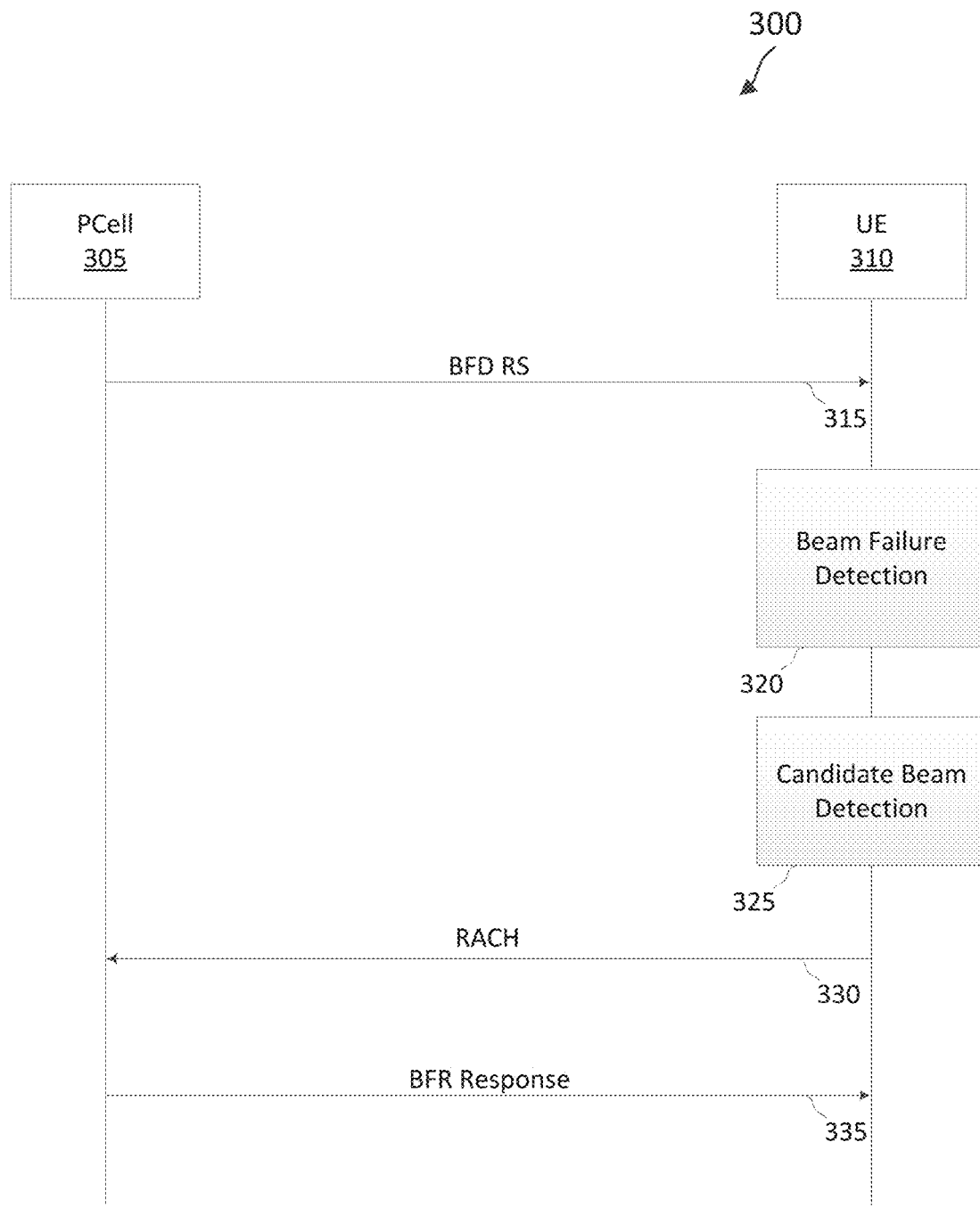
FIG. 3A illustrates an example of a process flow that supports beam failure recover techniques for multiple transmission-reception points according to some aspects of the present disclosure.

FIG. 3A illustrates an example of a process flow 300 that supports beam failure recovery techniques for multiple beam groups in a serving cell in accordance with aspects of the present disclosure. In some examples, process flow 300 may implement aspects of wireless communications system 100 or 200 and further illustrates aspects of the process flow 230 of FIG. 2B. Process flow 300 may be implemented by a UE 310 and a PCell 305 that has two values of CORESET pool index values (and is served by multiple different beam groups) as described herein. In the following description of the process flow 300, the communications between the UE 310 and the Pcell 305 may be transmitted in a different order than the example order shown, or the operations performed by the UE 310 and Pcell 305 may be performed in different orders or at different times. Some operations may also be omitted from the process flow 300, and other operations may be added to the process flow 300.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At message 315, the Pcell 305 may transmit, and UE 310 may receive, one or more BFD reference signals of a set of BFD reference signals. In this regard, the UE 310 may be monitoring for the BFD reference signals based on a beam group BFD parameter or a cell-level BFD parameter. The UE 310 may measure one or more channel metrics of the BFD reference signals as part of a BFD. In accordance with various aspects, the BFD reference signals may be transmitted by different beam groups, and have multiple CORE-SET pool index values, and the BFD reference signals have an indication of the associated CORESET pool index value (e.g., zero or one, based on a reference signal sequence that is configured to a CORESET pool index value).

At step 320, the UE 310 may determine that a BFD is detected (e.g., as discussed above in FIG. 2B). In some cases, the detection of the BFD may be based on a channel metric of the reference signal being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. In some instances, if the BFD reference signals are not configured, the reference signal sets indicated by the active TCI states of CORESETs monitored by the UE 310 may be used. If, for an active TCI state of a CORESET, there are multiple reference signal indices, the one with QCL-TypeD is preferentially used. Otherwise, QCL-TypeA, QCL-TypeB, or QCL-TypeC can be used. The physical layer in the UE 310 may assess the radio link quality according to the BFD set against the threshold value (e.g., $Q_{out}$). In some instances, if radio link quality is worse than $Q_{out}$ for all the reference signals in the BFD resource set, then the UE 310 may declare a beam failure.

At step 325, the UE 310 may perform candidate beam detection (CBD). In some cases, CBD may be based on periodic CSI-RS/SSB that are configured by RRC (e.g., configured by RRC parameter candidateBeamRSList). In some cases, up to 16 resources with the corresponding random access preamble index (e.g., ra-preamble-index) may be configured. The UE 310 may provide reference signal indices and the RSRP among the list that have equal or larger RSRP value than a threshold value (e.g., $Q_{in}$), which may be a configurable threshold.

At communications 330, the UE 310 may initiate a BFR based on a beam group BFD parameter or a cell-level BFD parameter. For example, in some instances the UE 310 may transmit a RACH request to the Pcell 305. In some cases, the UE 310 may initiate random access procedures (e.g., contention-free random access) based on the random access resource (e.g., ra-preamble-index) associated with a selected reference signal index with RSRP above the threshold (e.g., RS index q_new).

At communications 335, the Pcell 305 may transmit, and the UE 310 may receive, a BFR response based on a beam group BFD parameter or a cell-level BFD parameter. In some cases, the UE 310 may monitor PDCCH in a search space set provided by a RRC parameter (e.g., recoverySearchSpaceId) for detection of a DCI format with CRC scrambled by C-RNTI or MCS-C-RNTI starting from slot n+4. If the UE 310 receives the PDCCH within this window, BFR is completed. Following the BFR response, the UE 310 may use quasi co-located (QCL) RS assumptions that the same QCL parameters as associated with reference signal index q_new until the UE 310 receives an activation for a TCI state. In some cases, after a set of symbols (e.g., 28 symbols) from a last symbol of a first PDCCH reception where the UE 310 detects a DCI format with CRC scrambled by C-RNTI or MCS-C-RNTI, the UE 310 assumes the same QCL parameters as the ones associated with RS index q_new for PDCCH monitoring in a CORESET with index 0.

In some cases, Pcell 310 may be configured with multiple beam groups (e.g., TRPs), and the CORESET pool index may be configured with multiple values. In some cases, separate RACH resources may be configured for different CORESET pool index values, which may allow the UE 310 to indicate beam failure associated with a particular CORESET pool index value, which may be associated with a particular beam group. As discussed herein, in some cases one or more Scells may be configured with multiple values of CORESET pool index, and a UE may perform a BFD/BFR for the Scell, an example of which is discussed with reference to FIG. 3B.

Figure 3B:
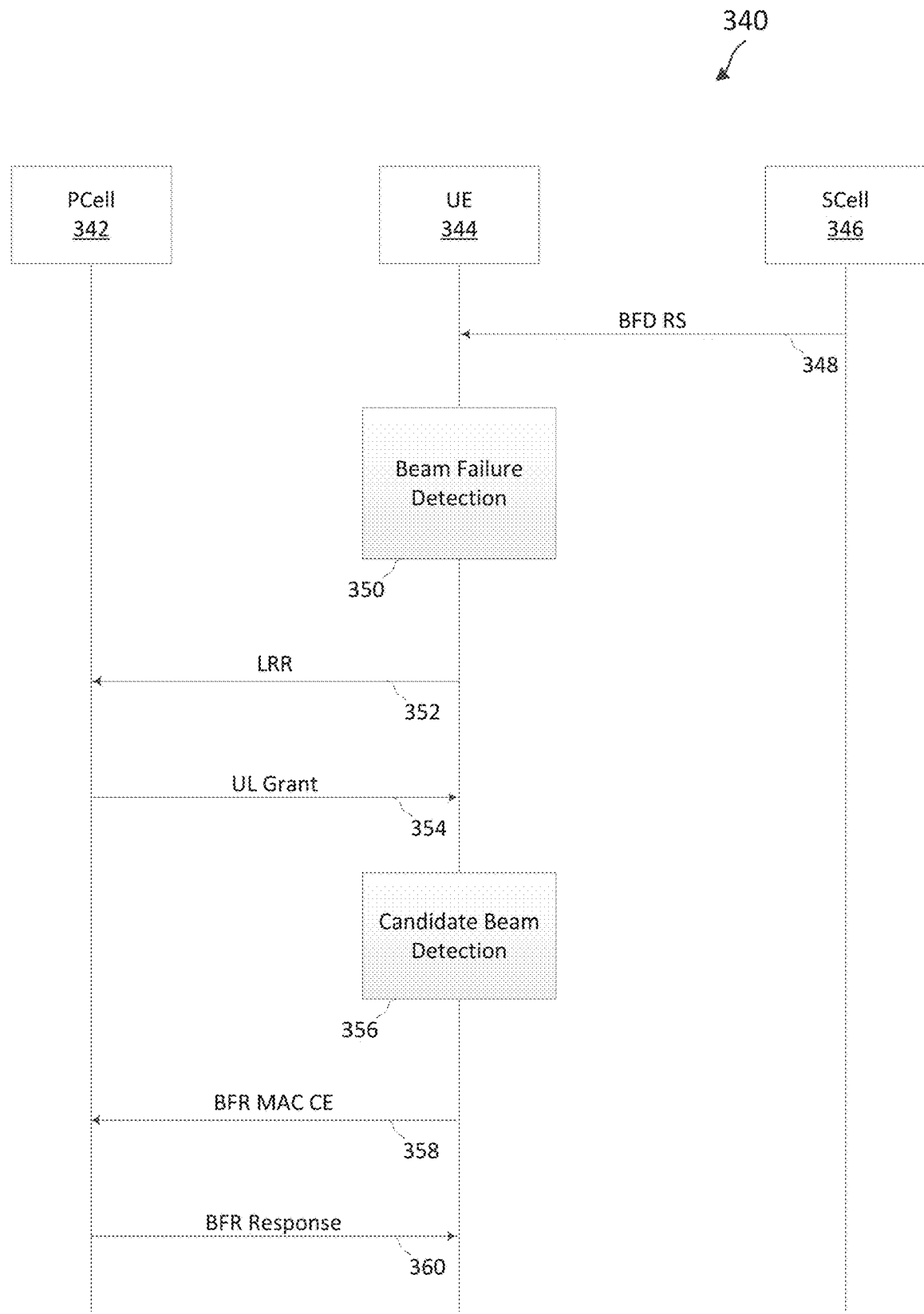
FIG. 3B illustrates an example of a process flow that supports beam failure recovery techniques for multiple transmission-reception points according to some aspects of the present disclosure.

FIG. 3B illustrates another example of a process flow 340 that supports beam failure recovery techniques for multiple beam groups in a secondary cell in accordance with aspects of the present disclosure. In some examples, process flow 340 may implement aspects of wireless communications system 100 or 200. Process flow 340 may be implemented by a UE 344 and a PCell 342 and a Scell 346, where the Scell 346 may have multiple values of CORESET pool index values (and is served by multiple different TRPs) as described herein. In the following description of the process flow 340, the communications between the UE 344, the Pcell 342, and the Scell 346 may be transmitted in a different order than the example order shown, or the operations performed by the UE 344, Pcell 342, and Scell 346 may be performed in different orders or at different times. Some operations may also be omitted from the process flow 340, and other operations may be added to the process flow 340.

In some examples, the operations illustrated in process flow 340 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At a high level, the UE 344 may monitor for BFD RS(s) from the Scell 346, report a BFD of the Scell 346 to the Pcell 342, and perform a BFR (e.g., via a RACH procedure) for the Scell 346 via the Pcell 342.

At communications 348, the Scell 346 may transmit, and UE 344 may receive, one or more BFD reference signals of a set of BFD reference signals. In this regard, the UE 344 may be monitoring for the BFD reference signals based on a beam group BFD parameter or a cell-level BFD parameter. The UE 344 may measure one or more channel metrics of the BFD reference signals as part of a BFD process. In accordance with various aspects, the BFD reference signals may be transmitted by different TRPs, and have multiple CORESET pool index values, and the BFD reference signals have an indication of the associated CORESET pool index value (e.g., zero or one, based on a reference signal sequence that is configured to a CORESET pool index value).

At step 350, the UE 344 may determine that a BFD is detected at the Scell 346. In some cases, similarly as discussed with reference to FIGS. 2B and 3A above, the detection of the BFD may be based on a channel metric of the reference signal (the BFD RS(s) received at communication 348) being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. If the BFD reference signals are not configured, the reference signal sets indicated by the active TCI states of CORESETs monitored by the UE 344 may be used. If, for an active TCI state of a CORESET, there are multiple reference signal indices, the one with QCL-TypeD is preferentially used. Otherwise, QCL-TypeA, QCL-TypeB, or QCL-TypeC can be used. The physical layer in the UE 344 may assess the radio link quality according to the BFD set against the threshold value (e.g., $Q_{out}$). If radio link quality is worse than $Q_{out}$ for all the reference signals in the BFD resource set, the UE 344 may declare a beam failure.

In one example, two sets of failure detection resources may be configured, each corresponding to a different CORESET pool index value. In another example, each resource within the failure detection resources used to transmit the BFD reference signals may be configured with a CORESET pool index value. In some cases, if a resource is not configured with a CORESET pool index value, it is assumed to be associated with CORESET pool index value zero. In some cases, a BFD reference signal resource may be configured with both values of CORESET pool index, in which case the associated reference signal may be considered for both TRPs. In some cases, when failure detection resources are not configured, reference signal sets indicated by the active TCI states of CORESETs configured with CORESET pool index zero or one determines the first and second sets of resources, respectively. In some cases, a beam failure for a value of CORESET pool index may be declared when radio link quality is worse than the configured threshold value (e.g., $Q_{out}$) for all the reference signals in the BFD resources that are associated with that CORESET pool index value.

At communications 352, the UE 344 may initiate a BFR based on a beam group BFD parameter or a cell-level BFD parameter. For example, the UE 344 may transmit a link recovery request (LRR) or other BFR request on the Pcell 342. In some cases, the recovery request may be transmitted on a Pcell, on a primary Scell (Pscell), or on a Scell that is configured for PUCCH (a PUCCH-Scell) in which PUCCH BFR is configured. The LRR may indicate that the UE 344 is requesting uplink resources (e.g., similar to a scheduling request (SR), and may use PUCCH format 0 or 1. In some cases, two PUCCH resources can be configured for LRR (e.g., indicated by schedulingRequestID-BFR-Scell) by two corresponding scheduling request IDs. The PUCCH resources or scheduling request IDs may be associated with the values of CORESET pool index. If BFD is declared for a value of CORESET pool index in Scell 346, in some cases, the PUCCH resource/scheduling request ID that corresponds to another value of CORESET pool index may be used for LRR transmission. Such a selection of resources provides that if the beams of Scell 346 and a PUCCH-cell are the same, and if all beams for one TRP become weak, LRR can be transmitted using a beam corresponding to the other TRP. Such a rule may be applied, for example, when the CC with PUCCH-BFR is in the same band as the Scell 346.

In other cases, the PUCCH resource/scheduling request ID that corresponds to the same value of CORESET pool index is used for LRR transmission. Such a selection may provide that LRR is transmitted to the same TRP for non-ideal backhaul scenario. Such a rule may be followed, for example, when separate feedback is configured for different cells (ACKNACKFeedbackMode=SeparateFeedback). In other cases, the PUCCH resource/scheduling request ID that corresponds to CORESET pool index=0 is used for LRR transmission. Such a rule can be followed, for example, when the CC with PUCCH-BFR is in a different band than the Scell 346. In still other cases, multiple PUCCH resources/scheduling request IDs may be used to transmit LRR irrespective of the CORESET pool index for which BFD is declared. This means that multiple instances of the LRR transmission are provided across the multiple PUCCH resources (and transmitted to both TRPs).

At communication 354, the Pcell 342 may provide an uplink grant to the UE 344. Such an uplink grant may be a normal uplink grant with C-RNTI/MCS-C-RNTI that can serve as response to LRR, which the UE 344 may use to transmit a PUSCH in which a BFRQ MAC-CE can be transmitted. It is noted that in some cases the UE 344 may have an existing uplink grant, in which cases the LRR and associated uplink grant operations may be skipped.

At step 356, the UE 344 may perform a CBD procedure. Before sending the MAC-CE with the beam failure recovery message, the UE 344 may first identify one or more candidate beams for the failed Scell 346. The CBD process may be performed in a similar manner as discussed with reference to FIG. 3A and FIG. 2B above, with the exception that the procedure is for Scell 346. In some cases, up to 64 resources (e.g., indicated in RRC in candidateBeamRSS-CellList-r16), which can be transmitted on the failed Scell 346 or another CC in the same band. In some cases, each candidate beam is associated with a CORESET pool index value. In one example, two lists of candidate beams may be provided (e.g., two lists for parameter candidateBeamRSS-CellList-r16 are configured) each corresponding to a CORESET pool index value. In another example, each reference signal in the list of candidate beams (e.g., in candidateBeamRSSCellList-r16) may be configured with a CORESET pool index value. In some cases, if a reference signal is not configured with a CORESET pool index value, it is assumed to be associated with CORESET pool index value zero. In addition, it can be allowed for a reference signal to be configured with both values of CORESET pool index, in which case it is considered for both TRPs. In some instances, when BFD is declared for a value of CORESET pool index, a candidate beam may be identified only within reference signals that are associated with the same value of CORESET pool index.

At communication 358, the UE 344 may transmit a beam failure recovery message in a BFR MAC-CE (a BFRQ). Examples of the BFR MAC-CE are discussed further below. The BFR MAC-CE can be transmitted using the resources provided in the uplink grant, and can be sent on any cell, including failed SCell 346 in some instances. In some cases, the UE 344 may indicate the CORESET pool index value in the Scell MAC-CE for the corresponding Scell 346. Such an indication may be provided, in some cases, in accordance with the examples discussed further below.

At communication 360, the Pcell 342 may provide a BFR response to the UE 344 based on a beam group BFD parameter or a cell-level BFD parameter. In some cases, the response may be an uplink grant to schedule a new transmission (e.g., with a toggled new data indicator (NDI)) for the same HARQ process as the PUSCH carrying the BFR MAC-CE. In some cases, if a new beam corresponding to a value of CORESET pool index in the Scell 346 is reported in the BFR MAC-CE, after 28 symbols from the end of the BFR response (end of PDCCH), the UE 344 may use a QCL assumption that only the CORESETs with the same value of CORESET pool index are reset to the new beam (e.g., $q_{new}$) in the Scell 346. Assuming that PUCCH resources are also associated with a value of CORESET pool index, spatial relation for only those PUCCH resources that are associated with the same value of CORESET pool index are reset to the new beam in the Scell 346 when the Scell 346 is a PUCCH-Scell. If PUCCH resources are not associated with a value of CORESET pool index, and if BFR MAC-CE indicates BFD and candidate beams for both values of CORESET pool index (e.g., two $q_{new}$ in the Scell 346), PUCCH beams are reset to the candidate beam corresponding to CORESET pool index=0 (when Scell is PUCCH-Scell).

Thus, in some cases the UE 344 may reset the beams for one or more PUCCH resources associated with the same value as the CORESET pool index value of the identified candidate beam, when the secondary cell is configured for uplink control information transmissions. Further, in some cases, the UE 344 may reset the beams for one or more PUCCH resources in response to the CORESET pool index value of the identified candidate beam having a first value (e.g., CORESET pool index=0), and refrain from resetting the beams for the one or more PUCCH resources in response to the CORESET pool index value of the identified candidate beam having a second value (e.g., CORESET pool index=1), when the secondary cell is configured for uplink control information transmissions.

Figure 3C:
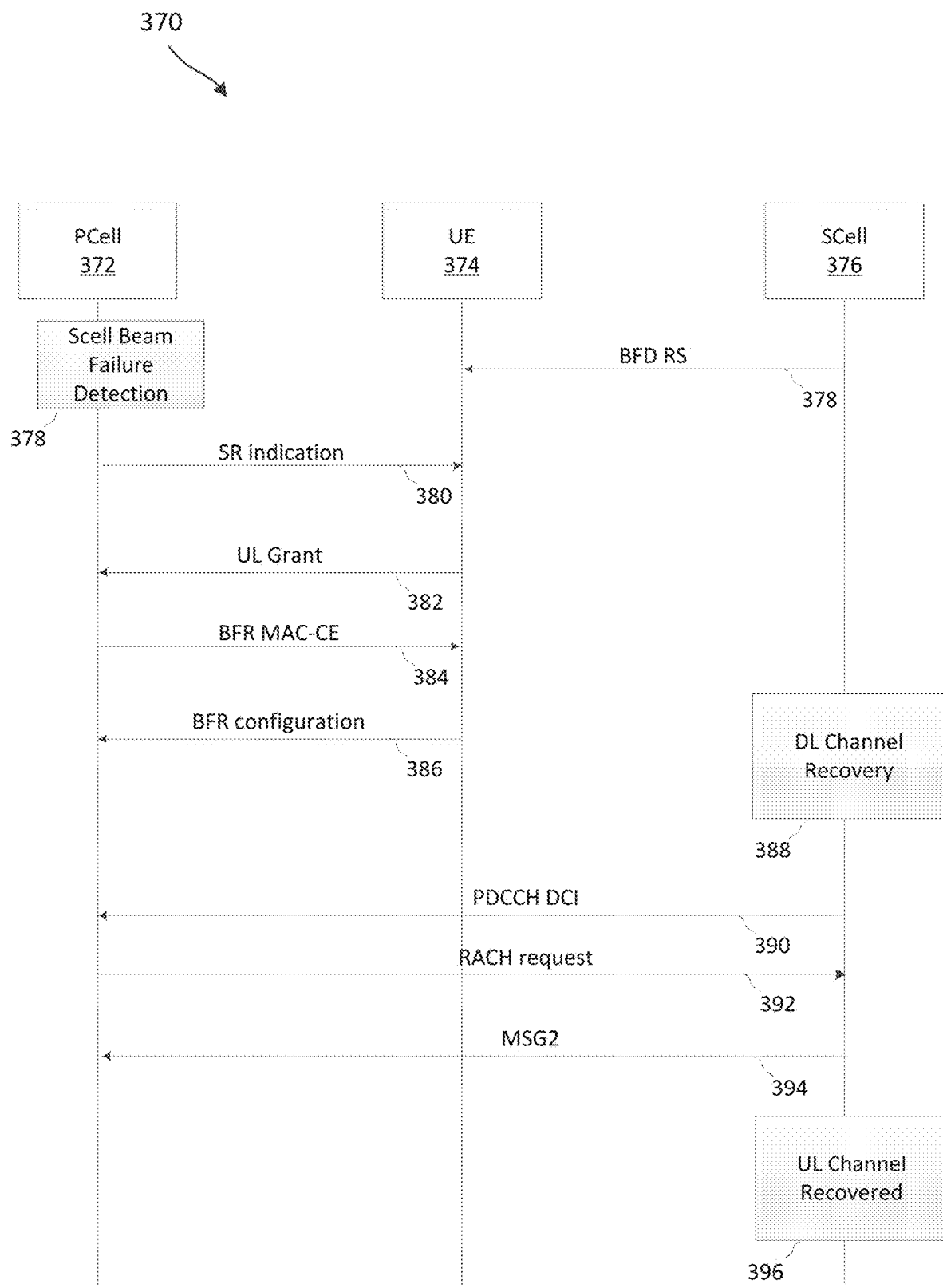
FIG. 3C further illustrates aspects of beam failure recovery according to some aspects of the present disclosure.

FIG. 3C illustrates another example process flow 370 for beam failure recovery techniques for multiple beam groups in a secondary cell in accordance with aspects of the present disclosure. In some examples, process flow 370 may implement aspects of wireless communications system 100 or 200. Process flow 370 may be implemented by a UE 372 and a Pcell 374 and a Scell 376, where the Scell 376 may have multiple values of CORESET pool index values (and is served by multiple different TRPs) as described herein. In some aspects, the Pcell 372 may operate over a carrier frequency in a frequency range 1 (FR1), and the Scell 376 may operate over a carrier frequency in a frequency range 2 (FR2). FR1 may refer to sub-6 GHz frequencies (e.g., between about 4 GHz to about 7 GHz), and FR2 may refer to mmWave frequencies (e.g., between about 24 GHz to about 52 GHz). In the following description of the process flow 370, the communications between the UE 372, the Pcell 374, and the Scell 376 may be transmitted in a different order than the example order shown, or the operations performed by the UE 372, Pcell 374, and Scell 376 may be performed in different orders or at different times. Some operations may also be omitted from the process flow 370, and other operations may be added to the process flow 370.

In some examples, the operations illustrated in process flow 340 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

The process flow 370 may be substantially similar to the process flow 340. For instance, the UE 344 may monitor for BFD RS(s) 377. from the Scell 376 and report a BFD of the Scell 376 to the Pcell 374. However, in the process flow 370, the UE 372 may perform a RACH procedure with the Scell 376 instead of the Pcell 374 to complete a BFR for the Scell 376.

At step 378, the UE 372 may determine that a BFD is detected at the Scell 376. In some cases, similarly as discussed with reference to FIGS. 2B, 3A, and 3B above, the detection of the BFD may be based on a channel metric of the reference signal (e.g., BFD RS(s) 377 received from the Scell 376 as discussed above with respect to communication 348 of FIG. 2B) being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. If the BFD reference signals are not configured, the reference signal sets indicated by the active TCI states of CORESETs monitored by the UE 374 may be used. If, for an active TCI state of a CORESET, there are multiple reference signal indices, the one with QCL-TypeD is preferentially used. Otherwise, QCL-TypeA, QCL-TypeB, or QCL-TypeC can be used. The physical layer in the UE 374 may assess the radio link quality according to the BFD set against the threshold value (e.g., $Q_{out}$). If radio link quality is worse than $Q_{out}$ for all the reference signals in the BFD resource set, the UE 374 may declare a beam failure.

In one example, two sets of failure detection resources may be configured, each corresponding to a different CORESET pool index value. In another example, each resource within the failure detection resources used to transmit the BFD reference signals may be configured with a CORESET pool index value. In some cases, if a resource is not configured with a CORESET pool index value, it is assumed to be associated with CORESET pool index value zero. In some cases, a BFD reference signal resource may be configured with both values of CORESET pool index, in which case the associated reference signal may be considered for both TRPs. In some cases, when failure detection resources are not configured, reference signal sets indicated by the active TCI states of CORESETs configured with CORESET pool index zero or one determines the first and second sets of resources, respectively. In some cases, a beam failure for a value of CORESET pool index may be declared when radio link quality is worse than the configured threshold value (e.g., $Q_{out}$) for all the reference signals in the BFD resources that are associated with that CORESET pool index value.

At communication 380, in response to the detecting the BFD at the Scell 376, the UE 372 transmits an SR indication to the Pcell 374 (over an FR1 frequency carrier of the Pcell 374) via a scheduling request (SR). In some aspects, the UE 372 may transmit the SR over a PUCCH resource, for example, using a PUCCH format 0 or a PUCCH format 1. The SR indication may request the Pcell 374 to provide the UE 372 with PUSCH resources, which may be used by the UE 372 to transmitting a BFRQ for the Scell 376. In other words, the UE 372 may determine to initiate a BFR for the Scell 376 by transmitting the SR indication.

In some aspects, the UE 372 may initiate a BFR for the Scell 376 based on a beam group BFD parameter or a cell-level BFD parameter. The SR indication may indicate that the UE 344 is requesting uplink resources, which the SR indication may be transmitted using a PUCCH resource. In some cases, two PUCCH resources can be configured for requesting BFR for the Scell 376 (e.g., indicated by schedulingRequestID-BFR-Scell) by two corresponding scheduling request IDs. The PUCCH resources or scheduling request IDs may be associated with the values of CORESET pool index. If BFD is declared for a value of CORESET pool index in Scell 376, in some cases, the PUCCH resource/scheduling request ID that corresponds to another value of CORESET pool index may be used for LRR transmission. Such a selection of resources provides that if the beams of Scell 376 and a PUCCH-cell are the same, and if all beams for one TRP become weak, the SR indication (the BFR request for the Scell 376) can be transmitted using a beam corresponding to the other TRP. Such a rule may be applied, for example, when the CC with PUCCH-BFR is in the same band as the Scell 376.

In other cases, the PUCCH resource/scheduling request ID that corresponds to the same value of CORESET pool index is used for the SR indication transmission. Such a selection may provide that the SR indication is transmitted to the same TRP for non-ideal backhaul scenario. Such a rule may be followed, for example, when separate feedback is configured for different cells (ACKNACKFeedbackMode=SeparateFeedback). In other cases, the PUCCH resource/scheduling request ID that corresponds to CORESET pool index=0 is used for SR indication (the BFR request for the Scell 376) transmission. Such a rule can be followed, for example, when the CC with PUCCH-BFR is in a different band than the Scell 376. In still other cases, multiple PUCCH resources/scheduling request IDs may be used to transmit the SR indication irrespective of the CORESET pool index for which BFD is declared. This means that multiple instances of the SR indication transmission are provided across the multiple PUCCH resources (and transmitted to both TRPs).

At communication 382, the Pcell 374 may provide an uplink grant to the UE 372. Such an uplink grant may be a normal uplink grant with C-RNTI/MCS-C-RNTI that can serve as response to the SR indication (the BFR request for the Scell 376), which the UE 372 may use to transmit a PUSCH in which a BFRQ MAC-CE can be transmitted. It is noted that in some cases the UE 344 may have an existing uplink grant, in which cases the LRR and associated uplink grant operations may be skipped.

At communication 384, the UE 372 may transmit a beam failure report indicating a BFD at the Scell 376 in a BFR MAC-CE (a BFRQ). Examples of the BFR MAC-CE are discussed further below. The BFR MAC-CE is transmitted using the resources provided in the uplink grant, and can be sent on any cell, including failed SCell 376. In some cases, the UE 372 may indicate the CORESET pool index value in the Scell MAC-CE for the corresponding Scell 376. In general, the UE 372 may indicate a beam failure and a desired or candidate beam for recovery. Such an indication may be provided, in some cases, in accordance with the examples discussed further below.

At communication 386, the Pcell 374 may provide a BFR configuration to the UE 372 for performing a BFR for the Scell 376. The FR configuration may indicate a new CORESET with a TCI State Activation for Scell 376 in a PUCCH TCI update. In some aspects, the BFR configuration may be based on a beam group BFD parameter or a cell-level BFD parameter. In some cases, the response may be an uplink grant to schedule a new transmission (e.g., with a toggled new data indicator (NDI)) for the same HARQ process as the PUSCH carrying the BFR MAC-CE. In some cases, if a new beam corresponding to a value of CORESET pool index in the Scell 346 is reported in the BFR MAC-CE, after 28 symbols from the end of the BFR response (end of PDCCH), the UE 344 may use a QCL assumption that only the CORESETs with the same value of CORESET pool index are reset to the new beam (e.g., $q_{new}$) in the Scell 346. Assuming that PUCCH resources are also associated with a value of CORESET pool index, spatial relation for only those PUCCH resources that are associated with the same value of CORESET pool index are reset to the new beam in the Scell 346 when the Scell 346 is a PUCCH-Scell. If PUCCH resources are not associated with a value of CORESET pool index, and if BFR MAC-CE indicates BFD and candidate beams for both values of CORESET pool index (e.g., two $q_{new}$ in the Scell 346), PUCCH beams are reset to the candidate beam corresponding to CORESET pool index=0 (when Scell is PUCCH-Scell).

Thus, in some cases the UE 344 may reset the beams for one or more PUCCH resources associated with the same value as the CORESET pool index value of the identified candidate beam, when the secondary cell is configured for uplink control information transmissions. Further, in some cases, the UE 344 may reset the beams for one or more PUCCH resources in response to the CORESET pool index value of the identified candidate beam having a first value (e.g., CORESET pool index=0), and refrain from resetting the beams for the one or more PUCCH resources in response to the CORESET pool index value of the identified candidate beam having a second value (e.g., CORESET pool index=1), when the secondary cell is configured for uplink control information transmissions.

At step 388, the Scell 376 may perform DL channel recovery and the DL channel recovered.

At communication 390, the Scell 376 may provide the UE 372 with a PDCCH DCI (e.g., transmitted via a FR2 frequency of the Scell 376. The PDCCH DCI may be transmitted based on a C-RNTI of the UE 372. The PDCCH DCI may indicate a resource for the UE 372 to transmit a RACH request (e.g., a RACH preamble or MSG1).

At communication 392, upon receiving the PDCCH DCI, the UE 372 may transmit a RACH request using the resource indicated by the PDCCH DCI received at communication 390.

At communication 394, upon receiving the RACH request, the Scell 376 may respond with MSG2. In some aspects, the MSG2 may indicate a scheduling grant for the UE 372 to transmit a UL communication. At which point, Scell UL channel is recovered at step 396.

The BFD and BFR procedures discussed herein can be executed on UEs and BSs implemented in the networks illustrated in FIG. 1 and FIG. 2A. Consequently, FIG. 4 illustrates an example UE 400 and FIG. 5 illustrates an example BS 500 according to some embodiments as discussed herein.

Figure 4:
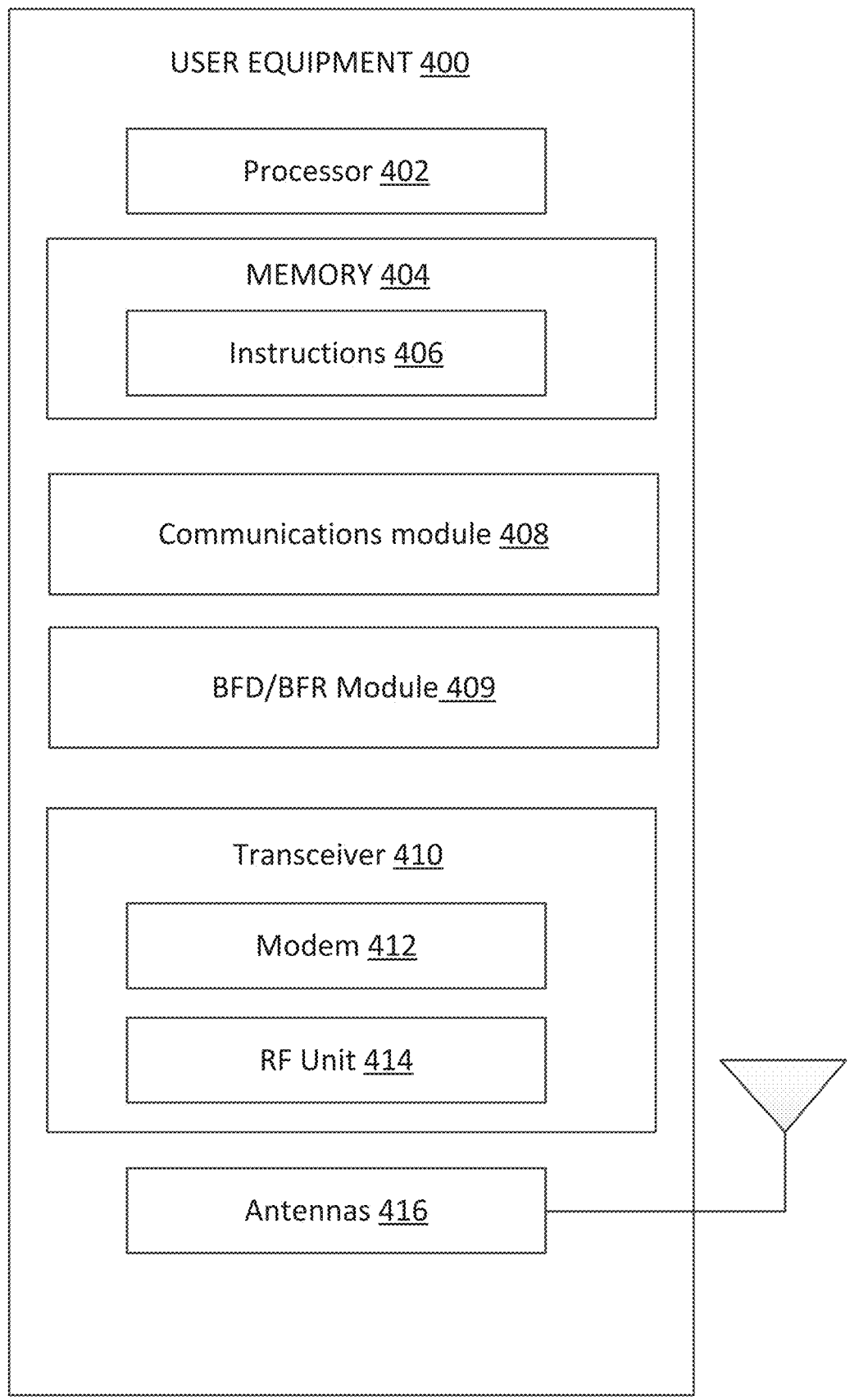
FIG. 4 is a block diagram of a user equipment (UE) according to some aspects of the present disclosure.
Figure 5:
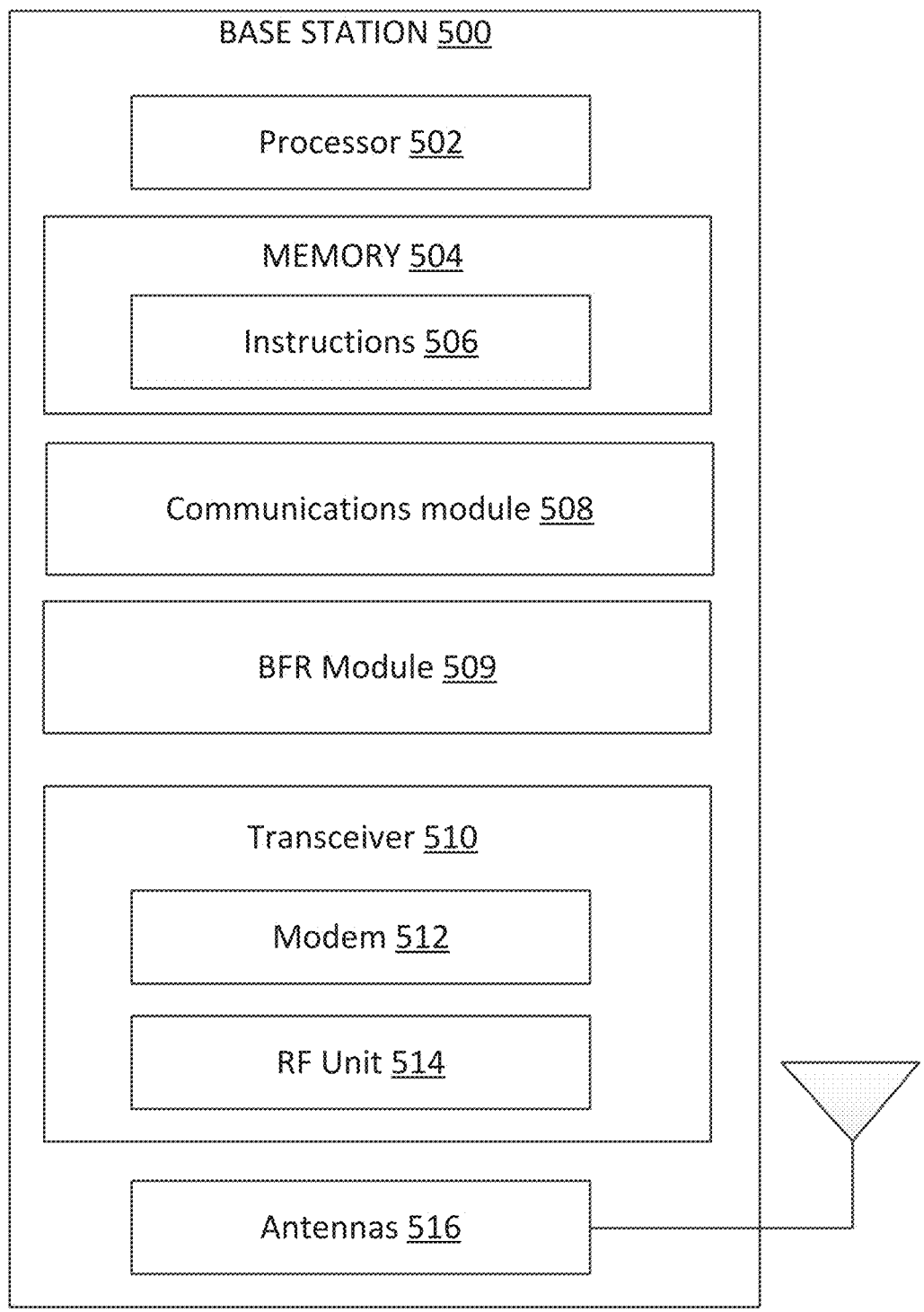
FIG. 5 is a block diagram of an exemplary base station (BS) according to some aspects of the present disclosure.

FIG. 4 is a block diagram of an exemplary UE 400 according to some aspects of the present disclosure. The UE 400 may be a UE 115, 205, 310, 344, 372 as discussed above in FIGS. 1, 2A, 3A, 3B, and 3C. As shown, the UE 400 may include a processor 402, a memory 404, communications module 408, a BFD/BFR module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2A-2B, 3A-3C, 6-8, 9A-9D, 10, and 11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Communications module 408, through transceiver 410, may establish a connection with at least a first beam group (e.g. TRP) using a first set of one or more beams and a second beam group (e.g. TRP) using a second set of one or more beams, where each of the first beam group and the second beam group are associated with a secondary cell of UE 400. In general, communications module 408, through transceiver 410, may establish a connection with multiple beam groups (e.g. mTRPs).

Communications module 408 may, as described herein, be implemented to realize one or more potential advantages. One implementation may allow the UE 408 to provide BFD indications and candidate beams for particular TRPs in a serving cell that uses multiple TRPs, which may enhance the overall channel quality of the network performance and allow for indication of failed beams of particular TRPs before an overall failure of the serving cell. Further, such implementations may allow UE 408 to increase communications reliability, throughput, and user experience, while reducing overall power consumption, among other advantages.

Communications module 408 may be implemented in hardware, code (e.g., software or firmware) executed by a processor, or any combination thereof. If implemented in code executed by a processor, the functions of the communications module 408, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. In particular, communications module 408 may be implemented on processor 402.

The BFD/BFR module 409 may be implemented via hardware, software, or combinations thereof. For example, the BFD/BFR module 409 may be implemented as a processor, circuit, and/or instructions 406 stored in the memory 404 and executed by the processor 402. In some instances, the BFD/BFR module 409 can be integrated within the modem subsystem 412 and communications module 408. For example, the BFD/BFR module 409 can be implemented by a combination of software components (e.g., executed by a DSP or a general processor) and hardware components (e.g., logic gates and circuitry) within the modem subsystem 412.

The BFD/BFR module 409 may be used for various aspects of the present disclosure, for example, aspects of aspects of FIGS. 2A-2B, 3A-3C, 6-8, 9A-9D, 10, and 11. The BFD/BFR module 409 can be configured to perform beam failure detection (BFD) and beam failure recovery (BFR) techniques based on one or more beam group parameter(s) and/or one or more cell-level parameter(s) as described herein. In particular, BFD/BFR module 409 can determine a beam failure configuration for a serving cell. The beam failure configuration can include at least one of a beam failure parameter of a beam group or a beam failure parameter of a cell. The BFD/BFR module 409 can also perform a beam failure detection in the serving cell based at least in part on the beam failure configuration. In this regard, the BFD/BFR module 409, along with communications module 408 and/or transceiver 410, may transmit a beam failure recovery request message that indicates the failed beam and candidate replacement beams. Additional aspects of operation of the BFD/BFR module 409 is further discussed below.

As discussed above, a UE operating in a serving cell (PCell/SCell/SpCell) may operate with beam group specific beam failure parameters, cell-level beam failure parameters, or combinations of beam group specific and cell-level BFR beam failure parameters according to a beam failure configuration based on aspects of the present disclosure. For example, a UE operating in a serving cell can be configured to perform beam group specific beam failure detection (BFD), cell level BFD, beam group specific beam failure recovery (BFR), cell BFR, radio link monitoring (RLM), radio link failure (RLF) recovery, and/or combination thereof. Accordingly, in some aspects the BFD/BFR module 409, in combination with other components and features of the UE 400, may facilitate the performance of group specific BFD, cell level BFD, beam group specific BFR, cell BFR, RLM, and/or RLF recovery in accordance with the present disclosure. In this regard, the BFD/BFR module 409 may determine which type(s) of BFD, BFR, and/or RLM/RLF should be performed and associated parameters. The BFD/BFR module 409 may cause the UE to initiate performance of one or more of the group specific BFD, cell level BFD, beam group specific BFR, cell BFR, RLM, and/or RLF recovery based on the determination.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH control information, PRACH signals, PUSCH data, SR indication, BFR request, MSG1, BFR MAC-CE) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., SSBs, RMSI, MIB, SIB, PRACH configuration, PDCCH, PDSCH, MSG2, UL grants, RRC configurations, BFD configurations, BFR configurations) to the communication module 408 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

FIG. 5 is a block diagram of an exemplary BS 500 according to some aspects of the present disclosure. The BS 500 may be a BS 105 in the network 100 as discussed above in FIG. 1, a Pcell/Scell 210, 305, 342, 346, 374, 376 as discussed above in FIGS. 2A, 3A, 3B, and 3C, and/or a TRP 215 as discussed above in FIG. 2A. As shown, the BS 500 may include a processor 502, a memory 504, a communication module 508, a BFR module 509, a transceiver 510 including a modem subsystem 512 and a RF unit 514, and one or more antennas 516. These elements may be in direct or indirect communication with each other, for example via one or more buses, and may, in some cases, be operated on a single processor 502.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2, 3A-3B, and 6-10. Instructions 506 may also be referred to as code, which may be interpreted broadly to include any type of computer-readable statement(s) as discussed above with respect to FIG. 4.

Communications module 508 may establish communications with a UE such as UE 400 via a serving cell (e.g., primary cell and/or a secondary cell), where communications via the serving cell use multiple beams. For example, a first transmission-reception point of the serving cell may use a first set of one or more beams and a second transmission-reception point of the serving cell may use a second set of one or more beams, configure a first uplink resource associated with the first transmission-reception point and a second uplink resource associated with the second transmission-reception point for transmission of a recovery request message that indicates a beam failure of the serving cell at the UE through BFR module 509, receive the recovery request message from the UE, and determine in BFR module 509, based on the recovery request message, that the UE has declared a beam failure.

Communications module 508, or its sub-components, may be implemented in hardware, code (e.g., software or firmware) executed by a processor, or any combination thereof. If implemented in code executed by a processor, the functions of communications module 508, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

BFR module 509 is coupled with communications module 508 and/or transceiver 510 to receive messages from the UE declaring a beam failure. In some instances, the BFR module 509 is configured to transmit one or more RRC messages or other communications to the UE that provide an indication of the available beam failure detection and/or recovery types (e.g., beam group or TRP-specific, cell level, BFR, RLF, etc.) available for use by the UE in the serving cell, including in some instances an explicit or implicit indication of associated parameters (e.g., resource(s), reference signals (BFD RSs), etc.). In some instances, the BFR module 509 is configured to transmit an indication of one or more threshold(s) for the UE to utilize in determining what type(s) of BFD, BFR, and/or RLM/RLF to perform in the serving cell under various situations. In some instances, one or more of the thresholds is dynamically configured by the BFR module 509. In some instances, the threshold(s) may be defined by a standard specification or otherwise predefined. Various aspects of the present disclosure, for example, aspects of aspects of FIGS. 2A-2B, 3A-3C, 6-8, 9A-9D, and 10-12 can be performed by BFR module 509.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., SSBs, RMSI, MIB, SIB, PRACH configuration PDCCH, PDSCH, MSG2, UL grants, RRC configurations, BFD configurations, BFR configurations, RLM configurations, RLF configurations) from the modem subsystem 512 (on outbound transmissions) or of transmissions originating from another source such as a UE 115, the UE 315, and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUCCH control information, PRACH signals, PUSCH data, SR indication, BFR request, MSG1, BFR MAC-CE) to the communication module 508 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
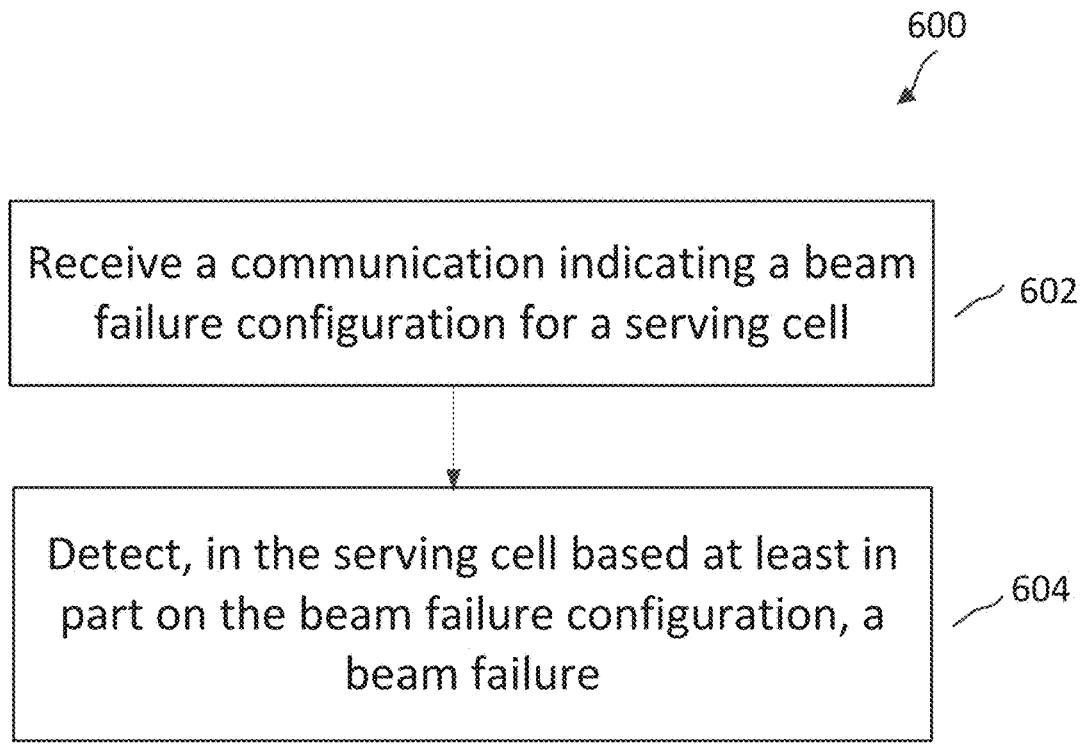
FIG. 6 illustrates a flow diagram of a communication method according to some aspects of the present disclosure.

FIG. 6 is a flow diagram illustrating a communication method 600 according to some aspects of the present disclosure. Aspects of the method 600 can be executed by a computing device (e.g., a processor, processing circuit, and/or other suitable component) of a wireless communication device or other suitable means for performing the steps. For example, a wireless communication device, such as a UE 115 or the UE 400, may utilize one or more components, such as the processor 402, the memory 404, the communications module 408, the BFD/BFR module 409, the transceiver 410, and/or the one or more antennas 416, to execute aspects of the method 600. Further, the method 600 may employ similar mechanisms as described in FIGS. 2A-3C, as well as aspects of FIGS. 6-8, 9A-9D, and 10-12. In some instances, aspects of the method 600 may be implemented between a UE 115 and a BS 105 of a serving cell, which may include multiple beam groups. As illustrated, the method 600 includes a number of enumerated steps, but the method 600 may include additional aspects before, after, and in between the enumerated steps. In some aspects, one or more of the enumerated steps may be omitted or performed in a different order.

At block 602, the UE receives from a BS a message or communication including a beam failure configuration for a serving cell. In some instances, the UE determines the beam failure configuration for the serving cell from or based on the message or communication. The serving cell may be a primary cell (PCell) and/or a secondary cell (SCell). In some instances, the UE determines the beam failure configuration for the serving cell based on an RRC message or other communication from a base station. In this regard, the RRC message or other communication from the BS may provide an indication of the available beam failure detection and/or recovery types (e.g., beam group or TRP-specific, cell level, BFR, RLF, etc.) available for use by the UE in the serving cell, including in some instances an explicit or implicit indication of associated parameters (e.g., resource(s), reference signals, etc.).

The beam failure configuration can include at least one of a beam failure parameter of a beam group (e.g., TRP, beam direction, component carrier, etc.) or a beam failure parameter of a cell (e.g., serving cell, primary cell, secondary cell). In some instances, beam group specific BFD and/or beam group specific BFR may be simultaneously configured on the same serving cell with cell BFD and/or cell BFR. Accordingly, in some instances BFD in a serving cell can be configured with beam group specific BFD and cell BFD. Similarly, in some instances BFR in a serving cell can be configured with beam group specific BFR and cell BFR. In some instances, BFD in a serving cell can be configured with only beam group specific BFD or only cell BFD, while BFR in the serving cell can be configured with beam group specific BFR and cell BFR. In some instances, BFD in a serving cell can be configured with beam group specific BFD and cell BFD, while BFR in the serving cell can be configured only with beam group specific BFR or only cell BFR. In some instances, BFD in a serving cell can be configured with only beam group specific BFD or only cell BFD, while BFR in the serving cell can be configured with only beam group specific BFR or only cell BFR. When both beam group specific and cell configurations are available for use in a serving cell for BFD and/or BFR, the UE may determine whether to use the beam group specific, cell, or both configurations in performing the BFD and/or the BFR.

In this regard, the beam failure configuration may be determined with consideration of various configuration options and/or associated rules as further discussed below.

At block 604, the UE performs beam failure detection based at least in part on the beam failure configuration determined at 602. In some instances, the UE detects a beam failure at block 604. The beam failure may be associated with one or more beams of a beam group of the serving cell. In some instances, the beam group is associated with one or more TRPs of the serving cell. In response to detecting a beam failure at 604, the UE may initiate a recovery (e.g., BFR and/or RLF recovery). In some cases, the recovery is performed based at least in part on the beam failure configuration determined at 602.

In some aspects, the UE determines, at 602, that the beam failure configuration for the serving cell includes the beam failure parameter of the beam group and does not include the beam failure parameter of the cell. Accordingly, the UE may perform the beam failure detection, at 604, based on the beam failure parameter of the beam group. In this regard, the UE may detect the beam failure based on the beam failure parameter of the beam group. In some instances, the beam failure parameter of the beam group includes one or more BFD parameters (e.g., information regarding BFD RSs) associated with the beam group. In this regard, the beam group may be associated with a TRP of the serving cell. For example, the beam failure parameter of the beam group may include at least one of a transmission-reception point (TRP)-specific beam failure detection (BFD) parameter or a TRP-specific beam failure recovery (BFR) parameter. In some instances, the UE determines, at block 602, that the beam failure configuration for the serving cell includes a plurality of transmission-reception point (TRP)-specific beam failure parameters associated with a plurality of TRPs and the UE performs the beam failure detection, at 604, by independently performing beam failure detection for each of the plurality of TRPs.

In some aspects, the UE determines, at 602, that the beam failure configuration for the serving cell includes the beam failure parameter of the cell (e.g., serving cell, primary cell, secondary cell) and does not include the beam failure parameter of the beam group. In this regard, the UE may determine, at 602, that the beam failure parameter of the cell comprises at least one of a cell-level beam failure detection (BFD) parameter or a cell-level beam failure recovery (BFR) parameter. Accordingly, the UE may perform the beam failure detection, at 604, based on the beam failure parameter of the cell. In this regard, the UE may detect the beam failure based on the beam failure parameter of the cell.

In some aspects, the UE determines, at 602, that the beam failure configuration for the serving cell includes a beam group-specific beam failure detection parameter and a cell-level beam failure detection parameter. In some instances, the UE determines that the beam failure parameter of the beam group includes a beam group-specific beam failure detection (BFD) parameter and that the beam failure parameter of the cell includes a cell-level BFD parameter. In some aspects, the UE performs the beam failure detection, at 604, by performing a first beam failure detection (BFD) based on the beam group-specific beam failure detection parameter and performing a second BFD based on the cell-level beam failure detection parameter. In some cases, the UE performs the first BFD based on the beam group-specific beam failure detection parameter by monitoring for at least one transmission-reception point (TRP)-specific BFD reference signal (RS). Similarly, in some cases the UE performs the second BFD based on the cell-level beam failure detection parameter by monitoring for at least one cell-level BFD RS. In some instances, the at least one TRP-specific BFD reference signal (RS) is independent of the at least one cell-level BFD RS. In some instances, the at least one TRP-specific BFD reference signal (RS) is based on the at least one cell-level BFD RS. For example, in some instances each TRP-specific BFD RS is within the set of available cell-level BFD RSs. That is, the TRP-specific BFD RSs for a cell can be a subset of or include all of the cell-level BFD RSs for the serving cell.

In some aspects, the UE further determines, at 602, that the beam failure configuration for the serving cell includes a beam group-specific beam failure recovery (BFR) parameter and does not include a cell-level beam failure recovery (BFR) parameter. Accordingly, in some instances, the UE determines the beam failure configuration includes a beam group-specific beam failure detection (BFD) parameter, a cell-level BFD parameter, and a beam group-specific BFR parameter, but does not include a cell-level BFR parameter. In some cases, the UE performs a BFR, in response to the detecting the beam failure at 604, based on the beam group-specific BFR parameter.

In some aspects, the UE further determines, at 602, that the beam failure configuration for the serving cell includes a cell-level beam failure recovery (BFR) parameter and does not include a beam group-specific beam failure recovery (BFR) parameter. Accordingly, in some instances, the UE determines the beam failure configuration includes a beam group-specific beam failure detection (BFD) parameter, a cell-level BFD parameter, and a cell-level BFR parameter, but does not include a beam group-specific BFR parameter. In some cases, the UE performs a BFR, in response to the detecting the beam failure at 604, a BFR based on the cell-level BFR parameter.

In some aspects, the UE determines, at 602, that the beam failure parameter of the beam group includes a transmission-reception point (TRP)-specific beam failure detection (BFD) parameter and a TRP-specific beam failure recovery (BFR) parameter. Accordingly, in some instances, the UE determines the beam failure configuration includes a TRP-specific BFD parameter, a TRP-specific BFR parameter, and at least one of a cell-level BFD parameter and/or a cell-level BFR parameter. The UE may perform the beam failure detection, at 604, based on the TRP-specific BFD parameter. In some instances, the TRP-specific BFD parameter includes one or more BFD parameters (e.g., information regarding TRP-specific BFD RSs) associated with the TRP. Further, the UE may perform, in response to the BFD based on the TRP-specific BFD parameter at 604 indicating the beam failure, a BFR procedure based on the TRP-specific BFR parameter.

In some aspects, the UE determines, at 602, that the beam group-specific beam failure detection parameter includes a transmission-reception point (TRP)-specific beam failure detection (BFD) parameter and the cell-level beam failure detection parameter includes a cell-level beam failure recovery (BFR) parameter. Accordingly, in some cases the UE performs the beam failure detection, at 604, based on the TRP-specific BFD parameter and, in response to the BFD indicating a beam failure, performs a BFR based on the cell-level BFR parameter.

In some aspects, the UE determines, at 602, that the beam group-specific beam failure detection parameter includes a transmission-reception point (TRP)-specific beam failure detection (BFD) parameter and a TRP-specific beam failure recovery (BFR) parameter and that the cell-level beam failure detection parameter includes a cell-level BFD parameter and a cell-level BFR parameter. Accordingly, in some cases the UE performs the beam failure detection, at 604, by performing a first BFD based on the TRP-specific BFD parameter and performing a second BFD based on the cell-level BFD parameter. In some instances, the UE performs, in response to the first BFD (based on the TRP-specific BFD parameter) indicating a beam failure, a first BFR based on the TRP-specific BFR parameter. In some instances, the UE performs, in response to the second BFD (based on the cell-level BFD parameter) indicating a beam failure, a second BFR based on the cell-level BFR parameter.

In some aspects, the UE determines, at 602, that the beam failure configuration for the serving cell includes a plurality of transmission-reception point (TRP)-specific beam failure parameters associated with a plurality of TRPs. In some instances, the UE performs the beam failure detection, at 604, by performing a beam failure detection (BFD) for each of the plurality of TRPs. In some case, the UE performs a beam failure recovery (BFR) based on a number of the BFDs indicating a beam failure. For example, in some instances if the number of BFDs indicating a beam failure is less than (or equal to) a threshold (or the threshold is otherwise met), then the UE may perform a TRP-specific BFR. In some instances, if one or more BFDs indicate a beam failure, but at least X other TRPs are working (e.g., do not have beam failure detected or have an ongoing BFR), then the UE may initiate a TRP-specific BFR for the one or more BFDs where beam failure was detected. If the number of BFDs indicating a beam failure is greater than (or equal to) a threshold Y (or the threshold is otherwise met), then the UE may perform a cell-level BFR. In some instances, the UE immediately triggers the performing of the cell-level BFR in response to the number of beam failures being greater than (or equal to) the threshold (or otherwise meeting the threshold). In some cases, the threshold Y is all TRPs in a serving cell. In some cases, the threshold Y is a number less than all of the TRPs in a serving cell or a percentage of the TRPs in the serving cell. In some instances, the performance of the BFR by the UE includes disallowing a cell-level BFR when a threshold number of working TRPs is exceeded. That is, if the beam failure detection, at 604, indicates a threshold number Z of TRPs (e.g., 1 or more) associated with a with the serving cell (or a component carrier or other beam group of the serving cell) are working (e.g., do not have beam failure detected or have an ongoing BFR, or become working with successful TRP-specific BFR), then the UE will refrain from initiating a cell-level BFR. In some instances, the method 600 includes the UE receiving, from a base station of the serving cell, an indication of at least one threshold value for determining whether to perform a TRP-specific BFR or a cell-level BFR. The threshold(s) may be associated with determining when to perform (or refrain from performing) the TRP-specific BFR and/or the cell-level BFR. In some instances, an indication of the threshold(s) (e.g., X, Y, and Z, or otherwise) is included in an RRC message or other communication from a base station. In this regard, the threshold(s) may be included in the RRC message (or other communication) from the BS that provides an indication of the available beam failure detection and/or recovery types (e.g., beam group or TRP-specific, cell level, BFR, RLF, etc.) available for use by the UE in the serving cell. In some instances, the threshold(s) may be defined by a standard specification or otherwise predefined.

In some aspects, the UE performs, in response to detection of a beam failure at 604, a cell-level beam failure recovery (BFR) and terminates any active TRP-specific BFRs. In this regard, the UE may terminate any active TRP-specific and/or beam group-specific BFRs upon the initiation of a cell-level BFR. Further, in some instances, the UE may refrain from initiating any TRP-specific and/or beam group-specific BFRs while performing the cell-level BFR.

In some aspects, the UE determines, at 602, that the beam group-specific beam failure detection parameter includes a plurality of transmission-reception point (TRP)-specific beam failure parameters associated with a plurality of TRPs and the cell-level beam failure detection parameter includes a radio-link failure (RLF) parameter. Accordingly, in some cases the UE performs the beam failure detection, at 604, for each of the plurality of TRPs based on the TRP-specific BFD parameters. Further, in some instances, the UE performs a recovery based on a number of the BFDs indicating a beam failure. For example, in some instances if the number of BFDs indicating a beam failure is less than (or equal to) a threshold (or the threshold is otherwise met), then the UE may perform a TRP-specific BFR. In some instances, if one or more BFDs indicate a beam failure, but at least X other TRPs are working (e.g., do not have beam failure detected or have an ongoing BFR), then the UE may initiate a TRP-specific BFR for the one or more BFDs where beam failure was detected. If the number of BFDs indicating a beam failure is greater than (or equal to) a threshold Y (or the threshold is otherwise met), then the UE may perform a RLF recovery. In some instances, the UE immediately triggers the performing of the RLF recovery in response to the number of beam failures being greater than (or equal to) the threshold (or otherwise meeting the threshold). In some cases, the threshold Y is all TRPs in a serving cell. In some cases, the threshold Y is a number less than all of the TRPs in a serving cell or a percentage of the TRPs in the serving cell. In some instances, the performance of the recovery by the UE includes not allowing a RLF recovery when a threshold number of working TRPs is exceeded. That is, if the beam failure detection, at 604, indicates a threshold number Z of TRPs (e.g., 1 or more) associated with a with the serving cell (or a component carrier or other beam group of the serving cell) are working (e.g., do not have beam failure detected or have an ongoing BFR, or become working with successful TRP-specific BFR), then the UE will refrain from initiating a RLF recovery. In some instances, the method 600 includes the UE receiving, from a base station of the serving cell, an indication of at least one threshold value for determining whether to perform a TRP-specific BFR or a RLF recovery. The threshold(s) may be associated with determining when to perform (or refrain from performing) the TRP-specific BFR and/or the RLF recovery. In some instances, an indication of the threshold(s) (e.g., X, Y, and Z, or otherwise) is included in an RRC message or other communication from a base station. In this regard, the threshold(s) may be included in the RRC message (or other communication) from the BS that provides an indication of the available beam failure detection and/or recovery types (e.g., beam group or TRP-specific, cell level, BFR, RLF, etc.) available for use by the UE in the serving cell. In some instances, the threshold(s) may be defined by a standard specification or otherwise predefined.

In some aspects, the UE performs, in response to detection of a beam failure at 604, a RLF recovery and terminates any active TRP-specific BFRs in the serving cell (e.g., SpCell). In this regard, the UE may terminate any active TRP-specific and/or beam group-specific BFRs upon the initiation of a RLF recovery. Further, in some instances, the UE may refrain from initiating any TRP-specific and/or beam group-specific BFRs while performing the RLF recovery.

In some aspects, the UE performs the beam failure detection, at 604, by performing a beam failure detection (BFD) based on the beam group specific beam failure detection parameter and performing a radio link monitoring (RLM) based on the cell-level beam failure detection parameter. In some instances, the UE performs the BFD based on the beam group-specific beam failure detection parameter by monitoring for at least one transmission-reception point (TRP)-specific BFD reference signal (RS). In some instances, the UE performs the RLM based on the cell-level beam failure detection parameter by monitoring for at least one RLM RS. In some instances, the at least one TRP-specific BFD reference signal (RS) is independent of the at least one RLM RS. In some cases, the at least one TRP-specific BFD RS is based on the at least one RLM RS. For example, in some instances each TRP-specific BFD RS is within the set of available RLM RSs. That is, the TRP-specific BFD RSs for a cell can be a subset of or include all of the RLM RSs for the serving cell.

In some aspects, the method 600 includes the UE triggering a radio link failure (RLF) recovery. In some instances, the UE performs, following the triggering of the RLF recovery, a plurality of transmission-reception point (TRP)-specific BFD procedures. In some cases, the UE may adjust a timer associated with the RLF procedure (e.g., T310 timer) based on a consecutive number of the TRP-specific BFDs indicating a beam failure. The adjusting the timer can include increasing or decreasing the timer by at least one of a predetermined amount of time or a percentage of a duration of the timer. For example, in some instances, if the consecutive number of the TRP-specific BFDs indicating a beam failure exceeds a threshold, then the UE can adjust the timer (e.g., reduce or speed up the timer for x ms or a certain percentage (e.g., 10%, 20%, 25%, 50%, or otherwise) of the total timer expiration duration). In some instances, the UE determines whether to adjust the timer based on the consecutive number of the TRP-specific BFD indicating the beam failure at a single TRP. That is, the UE determines whether to adjust the timer based on how many times in a row the same TRP causes the TRP-specific BFD to indicate a beam failure. In some instances, the UE determines whether to adjust the timer based on the consecutive number of the TRP-specific BFDs indicating the beam failure at a plurality of TRPs. That is, the UE determines whether to adjust the timer based on how many times in a row the any TRP (or any TRP in a group of TRPs) indicates a beam failure as a result of the TRP-specific BFD. In some instances, the UE determines the amount to adjust the timer based on the number of TRPs indicating a beam failure. For example, in some cases the reduction in the timer is based on the number of TRPs with beam failure (e.g., 1 TRP=x ms or y %; 2 TRPs=2x ms or 2y %; 3 TRP=3x ms or 3y %; 4 TRPs=4x ms or 4y %). Accordingly, in some instances the UE adjusts the timer based on a number of TRPs associated with the TRP-specific BFDs indicating the beam failure.

Figure 7:
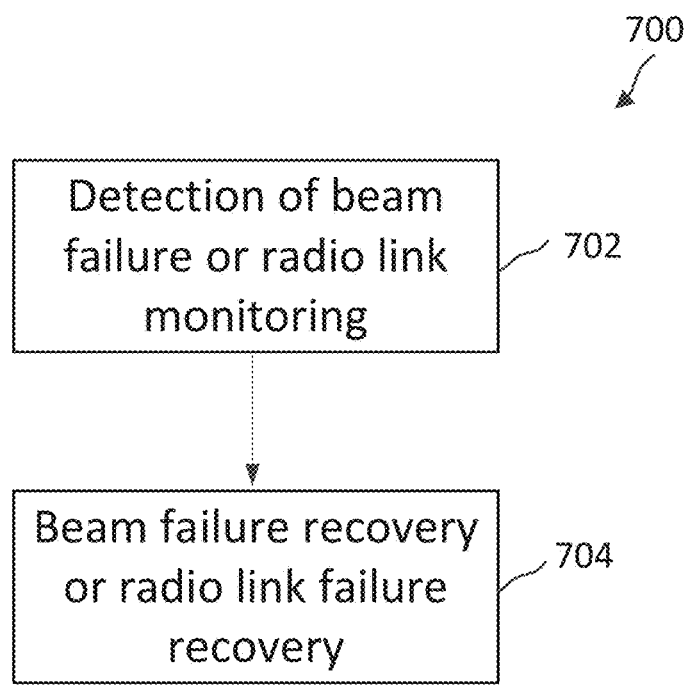
FIG. 7 illustrates a flow diagram of a communication method according to some aspects of the present disclosure.

FIG. 7 illustrates a recovery 700 that includes detection of a beam failure in step 702 and a recovery in step 704. As indicated in FIG. 7, detection of a beam failure in step 702 can include either a beam failure detection (BFD) or a radio link monitoring (RLM). The recovery in step 704 includes either a beam failure recovery (BFR) or a radio link failure (RLF) recovery. Detection of a beam failure in step 702 may include a beam failure detection (BFD) at either beam group (e.g. TRP) or cell-level, or performance of a radio link monitor (RLM) at cell-level. In particular, the BFD procedure includes monitoring BFD reference signals (RSs), which may be a beam group BFD RS or a cell BFD RS. In step 704, the appropriate recovery procedure is performed (e.g. BFR at the beam group, BFR on the cell, or RLF on the cell). In step 702, a beam group BFR can be independently performed on each beam group (e.g. TPR) in the cell in accordance with the beam failure configuration as illustrated in FIG. 6.

Figure 8:
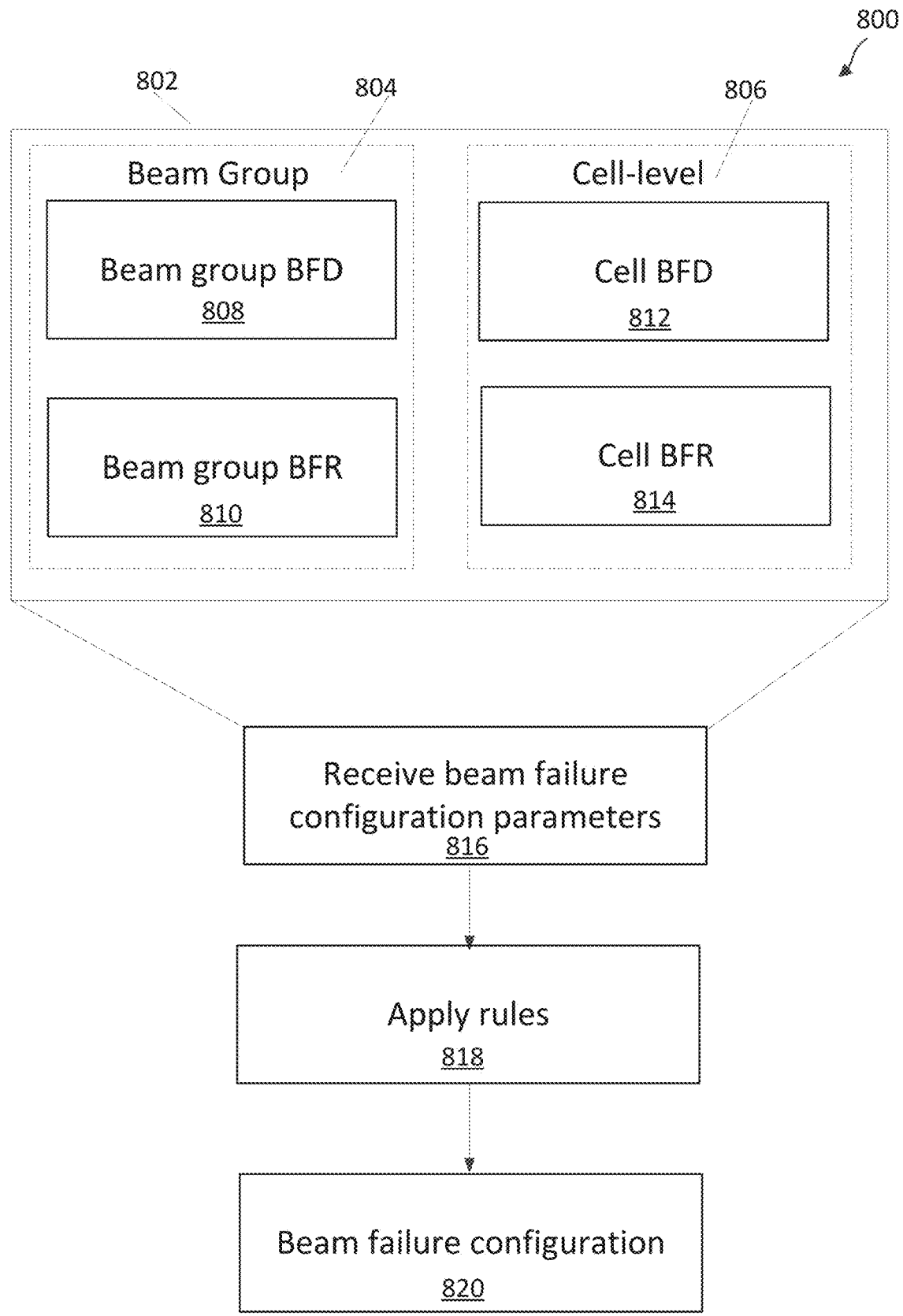
FIG. 8 illustrates an example determination of a beam failure configuration according to some aspects of the present disclosure.

FIG. 8 illustrates an example determination of the beam failure configuration according to some embodiments. As is illustrated, the beam failure configuration 818 is determined from a set of beam failure parameters 802 that include beam failure parameters of a beam group 804 and beam failure parameters of a cell 806. As is illustrated, the beam failure parameters of the beam group 804 includes beam group BFD 808 and beam group BFR 810. Similarly, beam failure parameters of the cell 806 in this example includes cell BFD 812 and cell BFR 814. The set of beam failure parameters 820 is processed in accordance with configuration process block 816 controls the beam failure configuration for beam failure configuration 818 in accordance with configuration options and configuration rules as discussed below.

The beam failure configuration on the same cell from the set of beam failure parameters 802 illustrated in FIG. 8 as determined in step 816 falls within one of four options depending on whether beam group BFD 808 and cell BFD can or cannot be simultaneously configured on the same servicing cell and whether beam group BFD 812 and cell group 814 can be simultaneously configured. These options are graphically illustrated in FIGS. 9A through 9D.

Figure 9A:
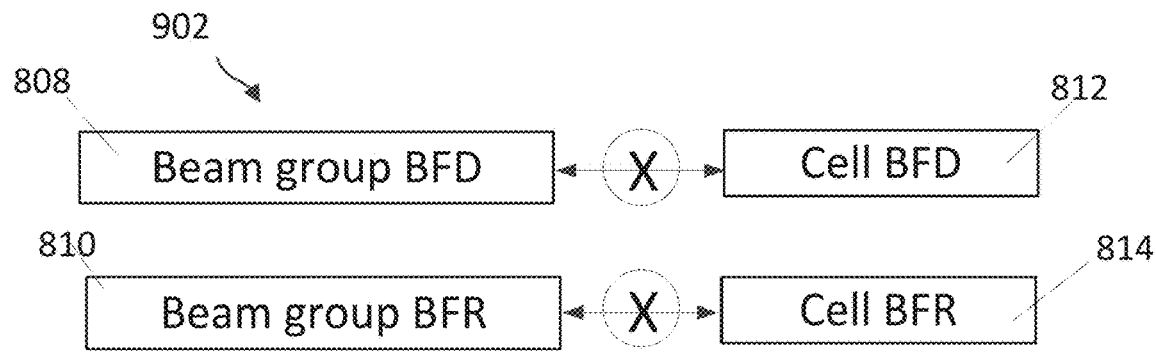
FIGS. 9A through 9D illustrate some beam failure configuration options according to some aspects of the present disclosure.

In a first option 902 illustrated in FIG. 9A, beam group BFD 808 and cell BFD 812 cannot be simultaneously configured and beam group BFR 810 and cell BFR 814 also cannot be simultaneously configured. In the first option, either beam group BFD 808 and beam group BFR 810 are configured or cell BFD and cell BFR can be configured. In addition, a configuration cannot include simultaneous configuration of the beam group BFD 808/beam group BFR 810 and cell BFD 812/cell BFR 814.

Figure 9B:
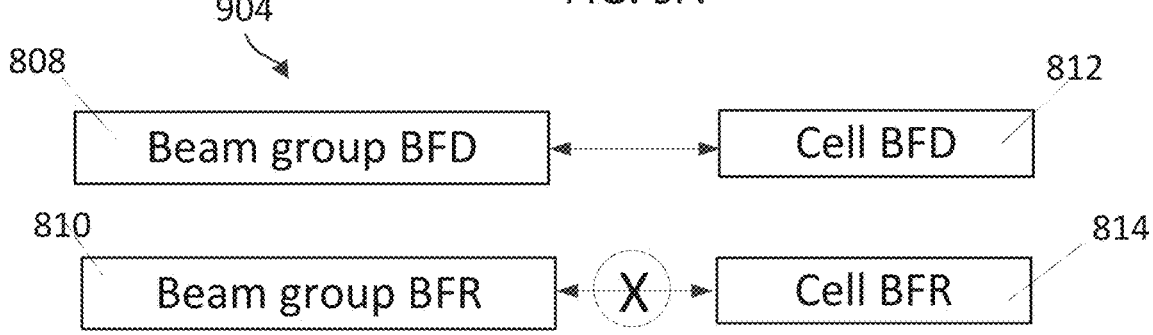

In a second option 904 illustrated in FIG. 9B, beam group BFD 808 and cell BFD 812 can be simultaneously configured while beam group BFR 810 and cell BFR 814 cannot be simultaneously configured. Although this option is less likely to occur than other options, if beam group BFD 808 and cell BFD 812 will both trigger the configured BFR (either beam group BFR 810 or cell BFR 814).

Figure 9C:
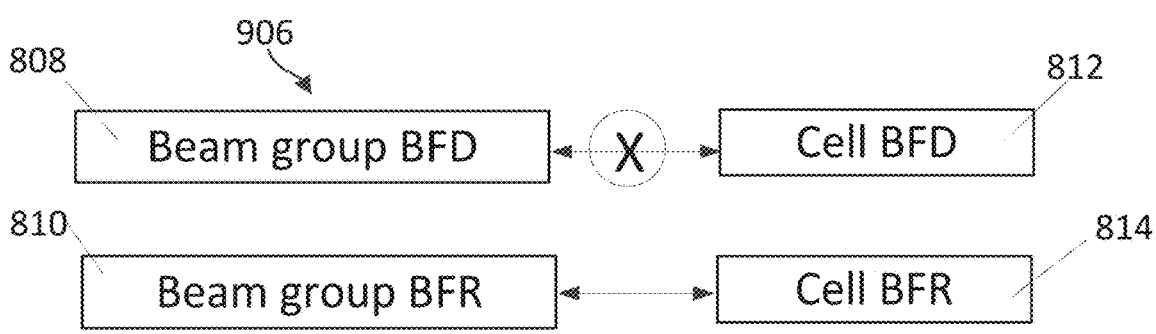

In a third option 906 illustrated in FIG. 9C, beam group BFD 808 cannot be simultaneously configured with cell BFD 812 while beam group BFR 810 can be simultaneously configured with cell BFR 814. In this option, for example, the serving cell may only be configured with beam group BFD 808, which will then trigger either of beam group BFR 810 or cell BFR 814.

Figure 9D:
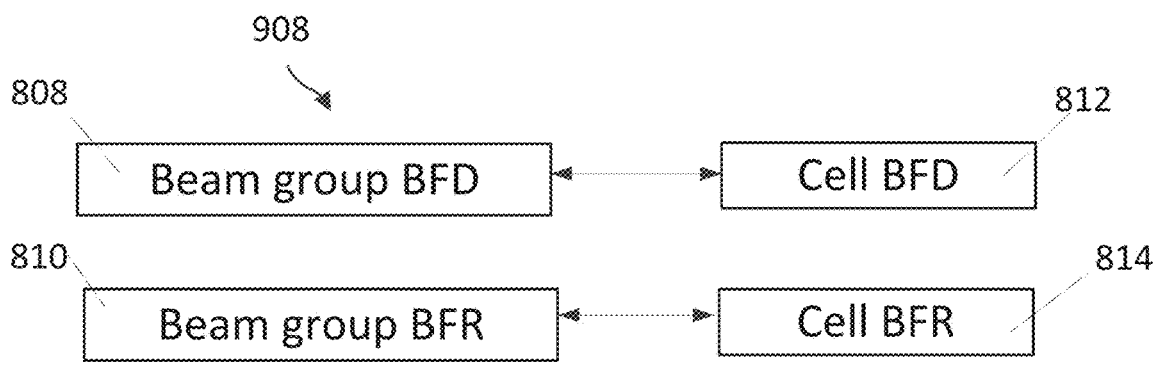

In a fourth option 908 illustrated in FIG. 9D, beam group BFD 808 can be simultaneously configured with cell BFD 812 while beam group BFR 810 can be simultaneously configured with cell BFR 814. In this option, for example, beam group BFD 808 can trigger beam group BFR 814 and cell BFD 812 can trigger cell BFR 814.

Configuration 816 illustrated in FIG. 8 configures the beam failure configuration according to one of the options illustrated in FIGS. 9A through 9D. In step 818, configuration of a set of rules applicable to the various configuration options are applied to the beam failure configuration. The result of steps 816 and 818 results in the beam failure configuration illustrated in step 820. These considerations that result in the beam failure configuration controls how performance of detection of the beam failure in step 604, and subsequent recoveries, operates. Consequently, step 604 in accordance with the beam failure configurations as discussed below executes instructions to affect these rules.

Figure 10:
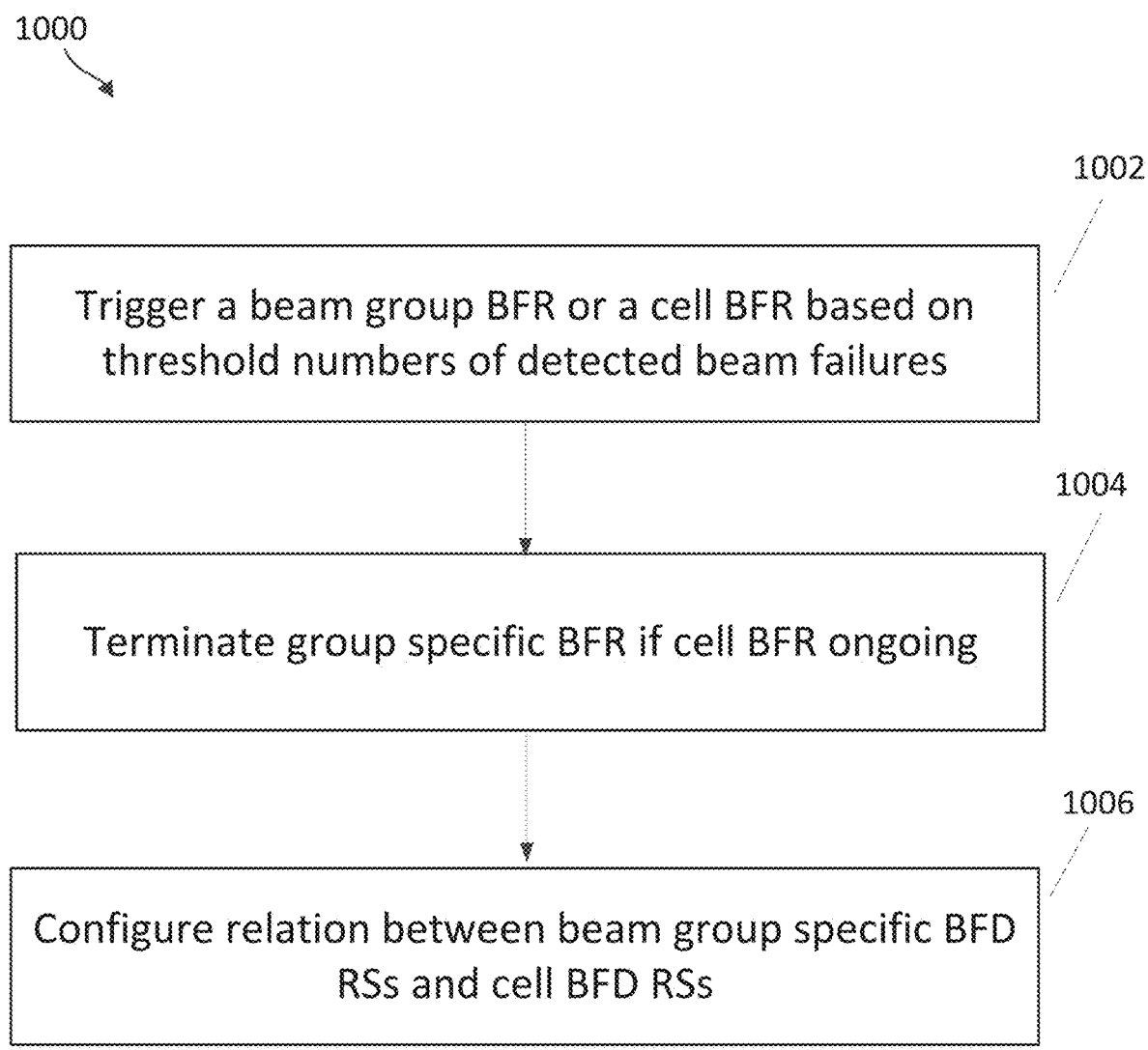
FIG. 10 a flow diagram of a communication method according to some aspects of the present disclosure.

FIG. 10 illustrates an example of step 818, where the beam failure configuration reflects rules that may be dependent on the configuration options that result from step 816. As illustrated in FIG. 10, in step 1002 a first rule that determines triggering of a beam group BFR or a cell BFR based on threshold numbers of detected beam failures. The rule reflected in step 1002 is applicable to third option 906 and fourth option 908, where beam group BFR 810 and cell BFR 814 can be simultaneously configured. In step 1002, the beam failure configuration can be arranged such that beam group BFD 808 may forbid or may trigger cell based BFR 814 in accordance with threshold values of the number of detected and number of working beams. Consequently, in step 1002 triggering of the beam group BFR 814 or the cell BFD 812 is dependent on the number of beam group failures are detected and the number of working beam groups. In particular, if one beam group fails based on beam group BFD 808 and at least a first number of other beam groups are working (i.e. there are not ongoing BFRs), then beam group BFR will be triggered for the one failed beam group. However, if at least a second number of group beams have failed as detected by the beam group BFD 808, then the beam group configuration is arranged to either allow triggering of cell BFR 814 in response to beam group BFD 808 (based on triggering conditions in step 604) or to immediately trigger the cell BFR 814 in response to beam group BFD 808. Additionally, if at least a third number of beam groups are working, or have become working through successful beam recovery, then triggering of cell BFRs is not allowed and any ongoing cell BFRs should be stopped.

In the first rule implementation reflected in step 1002, the threshold numbers (first number, second number, third number) may be fixed in a specification or may be signaled by a base station. In one particular example, the first number may be 1, the second number may be the number of beam groups in the cell, and the third number may be 1. However, particular combinations of parameters can be application specific.

In step 1004, configuration consistent with a second rule is implemented. The second rule is applicable to third and fourth options (options 906 and 908) where both beam group BFR 810 and cell BFR 814 can be simultaneously configured. In step 1004, under this rule, the beam failure configuration may be arranged such that triggering a cell BFR 814 may forbid triggering a beam group BFR 810. Further, if a cell BFR 814 is ongoing, then any ongoing beam group BFRs 810 may be terminated and new beam group BFRs 810 will not be triggered.

In step 1006 a third rule is implanted that is applicable when both beam group BFD 808 and cell BFD 812 may be configured (e.g. option 4 908). In accordance with rule 3 in step 1006, the beam failure configuration may be arranged such that BFD reference signals (RSs) for both beam group BFD 808 and cell BFD 812 can be configured independently or dependently. As discussed above, during a BFD the indicated BFD RSs are monitor. In some beam failure configurations the BFD RSs for a group beam BFD 808 may be independently configured from the BFD RSs for a cell BFR 814. Alternatively, in some beam failure configurations, the BFD RSs for group beam BFDs 808 may be identical, a subset of, or include all of the set of BFD RSs for cell BFRs 814. For example, if beam group specific BFD RSs includes an RS1 and RS2 for beam group 1 and beam group 2, then both RS1 and RS2 are configured to cell BFD RSs as well.

Figure 11:
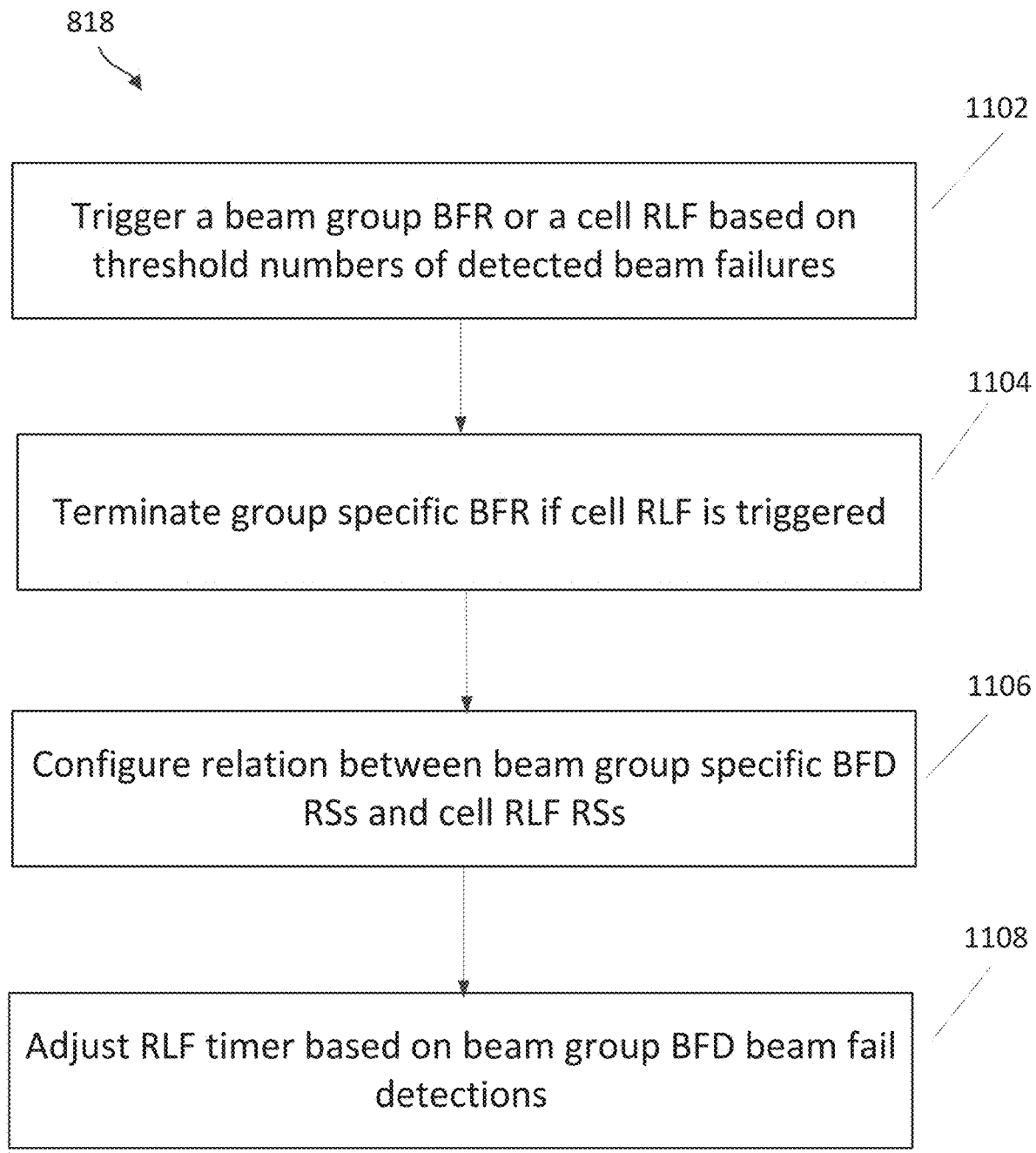
FIG. 11 a flow diagram of a communication method according to some aspects of the present disclosure.

As discussed above, embodiments of the present disclosure can also be applicable to configurations between beam group BFD/BFR and cell RLM/RLF. Similar options as those indicated above can be applied during the configuration with cell RLM replacing cell BFD 812 in the discussion and cell RLF replacing cell BFR 814 in the discussion. However, the following additional rules may be applicable with regard to cell (e.g. SpCell) RLFs. FIG. 11 illustrates an embodiment of step 818 where the beam failure configuration reflects the appropriate RLF rules.

In step 1102 of FIG. 11, a first RLF rule is configured. The first rule is applicable where a beam group BFR 810 and a cell RLF can be simultaneously configured (like options 3 and 4 above). In step 1102, the beam failure configuration may be arranged such that a beam group BFD 808 may either forbid or may trigger a cell RLF based on threshold numbers of detected beam failures detected by beam group BFDs 808. In particular, if one beam group fails as detected by its beam group BFD 808 and at least a first number of other beam groups are working (e.g., there are no ongoing beam recoveries), then a beam group BFR 810 will be triggered for this one failed beam group. If at least a second number of beam groups have failed, then beam failure configuration states that either the cell RLF is allowed to be triggered based on existing triggering conditions or the cell RLF is immediately triggered in response to the beam group BFD 808. If at least a third number of beam groups are working, or become working through successful beam recovery, then the cell RLF is not allowed to be triggered and ongoing cell RLF should be stopped (e.g., the RLF timer should not be started and should be stopped if it is already started for ongoing cell RLFs). The threshold values (first number, second number, and third number) can be received from a base station.

In step 1104, a second RLF rule is implemented. In the second rule, the beam failure configuration can be arranged such that operation of a cell RLF forbids operation of a beam group BFR. If a cell RLF has been triggered, for example on an SpCell, and a corresponding connection reestablishment procedure is ongoing, then beam group BFRs should be terminated and further beam group BFRs should not be triggered.

In step 1106, a third RLF rule is implemented. In the third rule, the beam failure configuration can be arranged such that configuration of beam group BFD RSs and cell RLM RSs can be dependent. Consequently, all beam specific BFD RSs can be identical, be a subset of, or include all of the cell RLM RSs. Consequently, if the beam group BFD RSs include RS1 and RS2 for beam group 1 and beam group 2, respectively, then both RS1 and RS2 can be used as cell RLM RSs.

In step 1108 a fourth RLF rule is implemented. In the fourth rule, the beam failure configuration can be arranged such that if the cell RLF has been triggered (i.e. an RLF timer has been started), the RLF time can be adjusted (reduced or speeded up) for a determined amount of time or a certain fraction of the total expiration duration of the RLF timer upon detection of beam group failures determined by a beam group BFD 808.

In a first embodiment of the fourth RLF rule of step 1108, the RLF timer may be adjusted in response to a number of consecutive beam group BFD indicators from the beam group BFD 808 from the same beam group. In another example, the RLF timer may be adjusted when a number of consecutive beam group BFD indicators across all beam groups as indicated by the beam group BFD 808 is received. For example, a certain number of consecutive BFD indicators can be received from a first TRP and another number from a second TRP resulting in the number of beam group BFD indicators.

In a second embodiment of the fourth RLF rule of step 1108, the RLF timer may be adjusted by a certain amount in accordance with each beam group BFD indicator determined by the beam group BFD 808.

Figure 12:
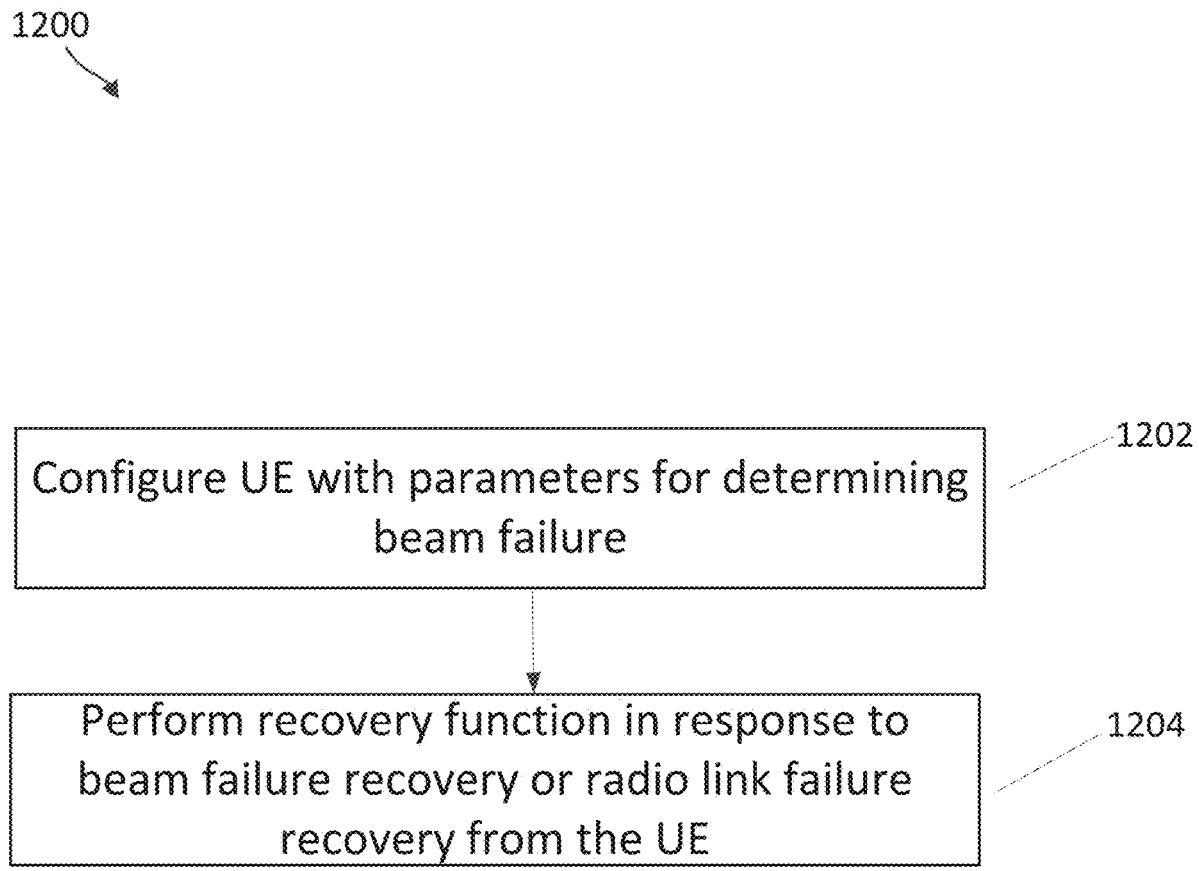
FIG. 12 a flow diagram of a communication method according to some aspects of the present disclosure.

FIG. 12 illustrates operation 1200 of a base station (BS) according to some embodiments of the present invention. In step 1202, the BS configured the UE with parameters applicable to determining the beam failure configuration as discussed above. For example, particular threshold values as discussed above may be downloaded to UE during one or more DCI communications with the UE. In step 1204, the BS 1204 performs recovery functions in response to BFRs or RLFs from the UE that result from the beam failure configurations discussed here.

RECITATION OF VARIOUS ASPECTS OF THE PRESENT DISCLOSURE

Aspect 1: A method of wireless communication performed by a user equipment (UE), the method comprising: receiving, from a base station (BS), a communication indicating a beam failure configuration for a serving cell, the beam failure configuration including at least one of a beam failure parameter of a beam group or a beam failure parameter of a cell; and detecting, in the serving cell based at least in part on the beam failure configuration, a beam failure.

Aspect 2: The method of aspect 1, wherein: the beam failure configuration for the serving cell includes the beam failure parameter of the beam group and does not include the beam failure parameter of the cell; and the detecting the beam failure comprises detecting the beam failure based on the beam failure parameter of the beam group.

Aspect 3: The method of aspect 1 or 2, wherein the beam failure parameter of the beam group comprises at least one of a transmission-reception point (TRP)-specific beam failure detection (BFD) parameter or a TRP-specific beam failure recovery (BFR) parameter.

Aspect 4: The method of any of aspects 1-3, wherein: the beam failure configuration for the serving cell includes a plurality of transmission-reception point (TRP)-specific beam failure parameters associated with a plurality of TRPs; and the detecting the beam failure comprises independently monitoring for beam for each of the plurality of TRPs.

Aspect 5: The method of aspect 1, wherein: the beam failure configuration for the serving cell includes the beam failure parameter of the cell and does not include the beam failure parameter of the beam group.

Aspect 6: The method of aspect 5, wherein the beam failure parameter of the cell comprises at least one of a cell-level beam failure detection (BFD) parameter or a cell-level beam failure recovery (BFR) parameter.

Aspect 7: The method of aspect 1, wherein: the beam failure configuration for the serving cell includes the beam failure parameter of the beam group and the beam failure parameter of the cell, wherein the beam failure parameter of the beam group includes a beam group-specific beam failure detection (BFD) parameter and the beam failure parameter of the cell includes a cell-level BFD parameter.

Aspect 8: The method of aspect 7, wherein the detecting the beam failure comprises: performing a first beam failure detection (BFD) based on the beam group-specific beam failure detection parameter; and performing a second BFD based on the cell-level BFD parameter.

Aspect 9: The method of aspect 7 or 8, wherein: the beam failure configuration for the serving cell includes a beam group-specific beam failure recovery (BFR) parameter and does not include a cell-level beam failure recovery (BFR) parameter, the method further comprising performing a BFR, in response to the detecting the beam failure, based on the beam group-specific BFR parameter.

Aspect 10: The method of aspect 7 or 8, wherein: the beam failure configuration for the serving cell includes a cell-level beam failure recovery (BFR) parameter and does not include a beam group-specific beam failure recovery (BFR) parameter, the method further comprising performing, in response to the detecting the beam failure, a BFR based on the cell-level BFR parameter.

Aspect 11: The method of any of aspects 8-10, wherein: the performing the first BFD based on the beam group-specific beam failure detection parameter comprises monitoring for at least one transmission-reception point (TRP)-specific BFD reference signal (RS); and the performing the second BFD based on the cell-level BFD parameter comprises monitoring for at least one cell-level BFD RS.

Aspect 12: The method of any of aspects 8-11, wherein the at least one TRP-specific BFD reference signal (RS) is independent of the at least one cell-level BFD RS.

Aspect 13: The method of any of aspects 8-11, wherein the at least one TRP-specific BFD reference signal (RS) is based on the at least one cell-level BFD RS.

Aspect 14: The method of aspect 1 or 7, wherein: the beam failure parameter of the beam group includes a transmission-reception point (TRP)-specific beam failure detection (BFD) parameter and a TRP-specific beam failure recovery (BFR) parameter; and the detecting the beam failure comprises performing a BFD based on the TRP-specific BFD parameter, the method further comprising: performing, in response to the BFD indicating the beam failure, a BFR based on the TRP-specific BFR parameter.

Aspect 15: The method of aspect 1 or 7, wherein: the beam group-specific beam failure detection parameter includes a transmission-reception point (TRP)-specific beam failure detection (BFD) parameter; the cell-level beam failure detection parameter includes a cell-level beam failure recovery (BFR) parameter; and the detecting the beam failure comprises performing a BFD based on the TRP-specific BFD parameter, the method further comprising: performing, in response to the BFD indicating a beam failure, a BFR based on the cell-level BFR parameter.

Aspect 16: The method of aspect 1 or 7, wherein: the beam group-specific beam failure detection parameter includes a transmission-reception point (TRP)-specific beam failure detection (BFD) parameter and a TRP-specific beam failure recovery (BFR) parameter; the cell-level beam failure detection parameter includes a cell-level BFD parameter and a cell-level BFR parameter; and the detecting the beam failure comprises: performing a first BFD based on the TRP-specific BFD parameter; and performing a second BFD based on the cell-level BFD parameter.

Aspect 17: The method of aspect 16, further comprising at least one of: performing, in response to the first BFD indicating a beam failure, a first BFR based on the TRP-specific BFR parameter; or performing, in response to the second BFD indicating a beam failure, a second BFR based on the cell-level BFR parameter.

Aspect 18: The method of any of aspects 1-17, wherein: the beam failure configuration for the serving cell includes a plurality of transmission-reception point (TRP)-specific beam failure parameters associated with a plurality of TRPs; and the detecting the beam failure comprises: performing a beam failure detection (BFD) for each of the plurality of TRPs; and performing, based on a number of the BFDs indicating a beam failure, a beam failure recovery (BFR).

Aspect 19: The method of aspect 18, wherein the performing the BFR comprises: performing, in response to the number being less than a threshold, a TRP-specific BFR.

Aspect 20: The method of aspect 18, wherein the performing the BFR comprises: performing, in response to the number being greater than a threshold, a cell-level BFR.

Aspect 21: The method of aspect 20, further comprising: immediately triggering the performing of the cell-level BFR in response to the number being greater than the threshold.

Aspect 22: The method of any of aspects 18-21, wherein the performing the BFR comprises: disallowing a cell-level BFR when a threshold number of working TRPs is exceeded.

Aspect 23: The method of any of aspects 18-22, further comprising: receiving, from the base station of the serving cell, an indication of at least one threshold value for determining whether to perform a TRP-specific BFR or a cell-level BFR.

Aspect 24: The method of any of aspects 1-23, wherein: further comprises: performing, in response to detection of the beam failure, a cell-level beam failure recovery (BFR); and terminating any active TRP-specific BFRs.

Aspect 25: The method of aspect 24, further comprising: refraining from initiating any TRP-specific BFRs while performing the cell-level BFR.

Aspect 26: The method of aspect 1 or 7, wherein: the beam group-specific beam failure detection parameter includes a plurality of transmission-reception point (TRP)-specific beam failure parameters associated with a plurality of TRPs; and the cell-level beam failure detection parameter includes a radio-link failure (RLF) parameter; the detecting the beam failure comprises performing a beam failure detection (BFD) for each of the plurality of TRPs, the method further comprising performing, based on a number of the BFDs indicating a beam failure, a recovery.

Aspect 27: The method of aspect 26, wherein the performing the recovery comprises: performing, in response to the number being (a) less than a threshold, a TRP-specific BFR; or (b) greater than a threshold, an RLF recovery.

Aspect 28: The method of aspect 26, wherein the performing the recovery comprises: performing, in response to the number being greater than a threshold, an RLF recovery.

Aspect 29: The method of aspect 26 or 28, wherein the performing the recovery comprises: immediately performing the RLF recovery in response to the number being greater than the threshold.

Aspect 30: The method of any of aspects 26-29, wherein performing the recovery comprises: disallowing an RLF recovery when a threshold number of working TRPs is exceeded.

Aspect 31: The method of any of aspects 26-30, further comprising: receiving, from the base station of the serving cell, an indication of at least one threshold value for determining whether to perform a TRP-specific beam failure recover (BFR) or an RLF recovery.

Aspect 32: The method of any of aspects 26-31, wherein the performing the recovery includes: performing an RLF recovery; and terminating any active TRP-specific beam failure recovery (BFR).

Aspect 33: The method of any of aspects 26-32, further comprising: refraining from initiating any TRP-specific BFRs while performing the RLF recovery.

Aspect 34: The method of aspect 1 or 7, wherein detecting the beam failure comprises: performing a beam failure detection (BFD) based on the beam group specific beam failure detection parameter; and performing a radio link monitoring (RLM) based on the cell-level beam failure detection parameter.

Aspect 35: The method of aspect 34, wherein: the performing the BFD based on the beam group-specific beam failure detection parameter comprises monitoring for at least one transmission-reception point (TRP)-specific BFD reference signal (RS); and the performing the RLM based on the cell-level beam failure detection parameter comprises monitoring for at least one RLM RS.

Aspect 36: The method of aspect 35, wherein the at least one TRP-specific BFD RS is based on the at least one RLM RS.

Aspect 37: The method of aspect 1 or 7, further comprising: triggering a radio link failure (RLF) recovery, the method further comprising: performing, following the triggering of the RLF recovery, a plurality of transmission-reception point (TRP)-specific BFDs; and adjusting, based on a consecutive number of the TRP-specific BFDs indicating a beam failure exceeding a threshold, a timer associated with the RLF recovery.

Aspect 38: The method of aspect 37, wherein the adjusting the timer includes increasing or decreasing the timer by at least one of a predetermined amount of time or a percentage of a duration of the timer.

Aspect 39: The method of aspect 37 or 38, wherein the consecutive number of the TRP-specific BFD indicating the beam failure is based on a single TRP.

Aspect 40: The method of aspect 37 or 38, wherein the consecutive number of the TRP-specific BFDs indicating the beam failure is based on a plurality of TRPs.

Aspect 41: The method of any of aspects 37-40, wherein the adjusting the timer includes adjusting the timer based on a number of TRPs associated with the TRP-specific BFDs indicating the beam failure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a base station (BS), a communication indicating a beam failure configuration, the beam failure configuration including at least one of a beam failure parameter of a beam group or a beam failure parameter of a cell, wherein the at least one of the beam failure parameter of the beam group or the beam failure parameter of the cell is associated with a cell-level triggering condition or a beam group-specific triggering condition for initiating a beam failure recovery (BFR) procedure; and
   detecting, in a serving cell based at least in part on the beam failure configuration, a beam failure.

2. The method of claim 1, wherein:
   the beam failure configuration includes the beam failure parameter of the beam group and does not include the beam failure parameter of the cell; and
   the detecting the beam failure comprises detecting the beam failure based on the beam failure parameter of the beam group.

3. The method of claim 2, wherein the beam failure parameter of the beam group comprises at least one of a transmission-reception point (TRP)-specific beam failure detection (BFD) parameter or a TRP-specific BFR parameter.

4. The method of claim 2, wherein:
   the beam failure configuration includes a plurality of TRP-specific beam failure parameters associated with a plurality of TRPs; and
   the detecting the beam failure comprises independently monitoring for beam for each of the plurality of TRPs.

5. The method of claim 1, wherein:
   the beam failure configuration includes the beam failure parameter of the cell and does not include the beam failure parameter of the beam group.

6. The method of claim 5, wherein the beam failure parameter of the cell comprises at least one of a cell-level BFD parameter or a cell-level BFR parameter.

7. The method of claim 1, wherein:
the beam failure configuration includes the beam failure parameter of the beam group and the beam failure parameter of the cell; and
the beam failure parameter of the beam group includes a beam group-specific BFD parameter and the beam failure parameter of the cell includes a cell-level BFD parameter.

8. The method of claim 7, wherein the detecting the beam failure comprises:
performing a first BFD based on the beam group-specific BFD parameter; and
performing a second BFD based on the cell-level BFD parameter.

9. The method of claim 8, wherein the beam failure configuration includes a beam group-specific BFR parameter and does not include a cell-level BFR parameter, the method further comprising:
performing a BFR, in response to performing the first BFD, based on the beam group-specific BFR parameter.

10. The method of claim 8, wherein the beam failure configuration includes a cell-level BFR parameter and does not include a beam group-specific BFR parameter, the method further comprising:
performing, in response to the performing the second BFD, a BFR based on the cell-level BFR parameter.

11. The method of claim 8, wherein:
the performing the first BFD based on the beam group-specific beam failure detection parameter comprises monitoring for at least one TRP-specific BFD reference signal (RS); and
the performing the second BFD based on the cell-level BFD parameter comprises monitoring for at least one cell-level BFD RS.

12. The method of claim 7, wherein:
the beam failure parameter of the beam group includes a TRP-specific BFD parameter and a TRP-specific BFR parameter; and
the detecting the beam failure comprises performing a BFD based on the TRP-specific BFD parameter, the method further comprising:
performing, in response to the BFD indicating the beam failure, a BFR based on the TRP-specific BFR parameter.

13. The method of claim 7, wherein:
the beam group-specific BFD parameter includes a TRP-specific BFD parameter;
the cell-level BFD parameter includes a cell-level BFR parameter; and
the detecting the beam failure comprises performing a BFD based on the TRP-specific BFD parameter, the method further comprising:
performing, in response to the BFD indicating a beam failure, a BFR based on the cell-level BFR parameter.

14. The method of claim 7, wherein:
the beam group-specific BFD parameter includes a TRP-specific BFD parameter and a TRP-specific BFR parameter;
the cell-level BFD parameter includes a cell-level BFD parameter and a cell-level BFR parameter; and
the detecting the beam failure comprises:
performing a first BFD based on the TRP-specific BFD parameter; and
performing a second BFD based on the cell-level BFD parameter.

15. The method of claim 14, further comprising at least one of:
performing, in response to the first BFD indicating the beam failure, a first BFR based on the TRP-specific BFR parameter; or
performing, in response to the second BFD indicating the beam failure, a second BFR based on the cell-level BFR parameter.

16. The method of claim 1, wherein:
the beam failure configuration includes a plurality of TRP-specific beam failure parameters associated with a plurality of TRPs; and
the detecting the beam failure comprises:
performing a BFD for each of the plurality of TRPs; and
performing, based on a number of BFDs indicating the beam failure, a BFR.

17. The method of claim 16, wherein the performing the BFR comprises:
performing, in response to the number being less than a first threshold, a TRP-specific BFR;
performing, in response to the number being greater than a second threshold, a cell-level BFR; or
disallowing the cell-level BFR when a threshold number of working TRPs is exceeded.

18. The method of claim 16, further comprising:
receiving, from the base station of the serving cell, an indication of at least one threshold value for determining whether to perform a TRP-specific BFR or a cell-level BFR.

19. The method of claim 18, wherein further comprises:
performing, in response to detection of the beam failure, a cell-level BFR; and
terminating any active TRP-specific BFRs.

20. The method of claim 7, wherein:
the beam group-specific BFD parameter includes a plurality of TRP-specific beam failure parameters associated with a plurality of TRPs; and
the detecting the beam failure comprises performing a BFD for each of the plurality of TRPs, the method further comprising:
performing, based on a number of BFDs indicating the beam failure, a recovery.

21. The method of claim 20, wherein:
the cell-level BFD parameter includes a radio-link failure (RLF) parameter; and
the performing the recovery comprises:
performing, in response to the number being less than a first threshold, a TRP-specific BFR;
performing, in response to the number being greater than a second threshold, an RLF recovery based on the RLF parameter; or
disallowing an RLF recovery when a threshold number of working TRPs is exceeded.

22. The method of claim 20, further comprising:
receiving, from the base station, an indication of at least one threshold value for determining whether to perform a TRP-specific BFR or an RLF recovery.

23. The method of claim 20, wherein the performing the recovery includes:
performing an RLF recovery; and
terminating any active TRP-specific BFR.

24. The method of claim 7, wherein detecting the beam failure comprises:
performing a BFD based on the beam group-specific BFD parameter; and performing a RLM based on the cell-level BFD parameter.

25. The method of claim 24, wherein:
the performing the BFD based on the beam group-specific beam failure detection parameter comprises monitoring for at least one transmission-reception point (TRP)-specific BFD reference signal (RS); and
the performing the RLM based on the cell-level beam failure detection parameter comprises monitoring for at least one RLM RS.

26. The method of claim 7, further comprising:
triggering a radio link failure (RLF) recovery;
performing, following the triggering of the RLF recovery, a plurality of transmission-reception point (TRP)-specific BFDs; and
adjusting, based on a consecutive number of the TRP-specific BFDs indicating the beam failure exceeding a threshold, a timer associated with the RLF recovery.

27. The method of claim 26, wherein:
the adjusting the timer includes increasing or decreasing the timer by at least one of a predetermined amount of time or a percentage of a duration of the timer; or
the adjusting the timer includes adjusting the timer based on a number of TRPs associated with the TRP-specific BFDs indicating the beam failure.

28. A user equipment (UE), comprising:
a memory;
a processor coupled to the memory; and
a transceiver coupled to the processor and configured to:
receive, from a base station (BS), a communication indicating a beam failure configuration, the beam failure configuration including at least one of a beam failure parameter of a beam group or a beam failure parameter of a cell, wherein the at least one of the beam failure parameter of the beam group or the beam failure parameter of the cell is associated with a cell-level triggering condition or a beam group-specific triggering condition for initiating a beam failure recovery (BFR) procedure, wherein the processor is configured to:
detect, in a serving cell based at least in part on the beam failure configuration, a beam failure.

29. A non-transitory computer-readable medium having program code recorded thereon for operation on a user equipment (UE), the program code comprising:
code for causing a UE to receive, from a base station (BS), a communication indicating a beam failure configuration, the beam failure configuration including at least one of a beam failure parameter of a beam group or a beam failure parameter of a cell, wherein the at least one of the beam failure parameter of the beam group or the beam failure parameter of the cell is associated with a cell-level triggering condition or a beam group-specific triggering condition for initiating a beam failure recovery (BFR) procedure; and
code for causing the UE to detect, in a serving cell based at least in part on the beam failure configuration, a beam failure.

30. A user equipment (UE), comprising:
means for receiving, from a base station (BS), a communication indicating a beam failure configuration, the beam failure configuration including at least one of a beam failure parameter of a beam group or a beam failure parameter of a cell, wherein the at least one of the beam failure parameter of the beam group or the beam failure parameter of the cell is associated with a cell-level triggering condition or a beam group-specific triggering condition for initiating a beam failure recovery (BFR) procedure; and
means for detecting, in a serving cell based at least in part on the beam failure configuration, a beam failure.

* * * * *